(12) United States Patent
Matsuzaki et al.

(10) Patent No.: US 8,724,434 B2
(45) Date of Patent: May 13, 2014

(54) MAGNETIC RECORDING SYSTEM AND MAGNETIC RECORDING DEVICE

(71) Applicant: TDK Corporation, Tokyo (JP)

(72) Inventors: Mikio Matsuzaki, Tokyo (JP); Koichi Shinohara, Tokyo (JP); Tatsuo Shibata, Tokyo (JP); Masashi Sahashi, Miyagi (JP); Tomohiro Nozaki, Miyagi (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 13/839,163

(22) Filed: Mar. 15, 2013

(65) Prior Publication Data

US 2013/0279309 A1   Oct. 24, 2013

Related U.S. Application Data

(60) Provisional application No. 61/614,646, filed on Mar. 23, 2012.

(51) Int. Cl.
*G11B 11/00* (2006.01)
*G11B 5/00* (2006.01)

(52) U.S. Cl.
USPC .................. 369/13.01; 369/13.06; 369/13.35; 360/55; 360/131

(58) Field of Classification Search
None
See application file for complete search history.

(56) References Cited

U.S. PATENT DOCUMENTS

| | | | |
|---|---|---|---|
| 5,768,065 A | 6/1998 | Ito et al. | |
| 7,123,451 B2 | 10/2006 | Sbiaa et al. | |
| 7,190,559 B2 | 3/2007 | Kagami et al. | |
| 7,440,229 B2 | 10/2008 | Sasaki et al. | |
| 7,580,222 B2 | 8/2009 | Sasaki et al. | |
| 7,679,860 B2 | 3/2010 | Kudo et al. | |
| 7,706,103 B2 | 4/2010 | Seigler | |
| 7,716,812 B2 | 5/2010 | Kato et al. | |
| 7,718,218 B2 | 5/2010 | Sasaki et al. | |
| 7,719,883 B2 | 5/2010 | Hochstrat et al. | |
| 8,284,527 B2 | 10/2012 | Yoshida et al. | |

(Continued)

FOREIGN PATENT DOCUMENTS

| | | |
|---|---|---|
| JP | 08-510095 A | 10/1996 |
| JP | 2001-196661 A | 7/2001 |

(Continued)

OTHER PUBLICATIONS

T. J. Martin and J. C. Anderson, IEEE Transactions on Magnetics, Antiferromagnetic Domain Switching in $Cr_2O_3$, Sep. 1966, vol. MAG-2, No. 3, p. 466, 447, 448, and 449.

(Continued)

*Primary Examiner* — Muhammad N Edun
(74) *Attorney, Agent, or Firm* — Posz Law Group, PLC

(57) ABSTRACT

A magnetic recording system including follows: a recording head, a recording medium that includes a first recording medium layer, a second recording medium layer, and a substrate. The magnetic recording system includes an electric field applying device applying an electric field and a magnetic field applying device applying a magnetic field to the recording medium, a movement mechanism that moves them to an arbitrary position. The magnetic recording system has a function of controlling an applying direction of at least one of the electric field applying device and the magnetic field applying device, and the recording head is arranged at a position facing the recording medium.

20 Claims, 26 Drawing Sheets

(56) References Cited

U.S. PATENT DOCUMENTS

| | | |
|---|---|---|
| 2005/0141137 A1 | 6/2005 | Okada et al. |
| 2006/0114606 A1 | 6/2006 | Ide |
| 2010/0103553 A1* | 4/2010 | Shimazawa et al. ............ 360/59 |
| 2010/0128377 A1* | 5/2010 | Zhou et al. ...................... 360/55 |

FOREIGN PATENT DOCUMENTS

| | | |
|---|---|---|
| JP | 2004-342183 A | 12/2004 |
| JP | 2007-265512 A | 10/2007 |
| WO | 9522820 A1 | 8/1995 |
| WO | 2009133650 | 11/2009 |

OTHER PUBLICATIONS

I. E. Dzyaloshinski Î, J. Exptl. Theoret Phys. (U.S.S.R.) 37, On the Magneto-Electrical Effect in Antiferromagnets, Sep. 1959, p. 628 and 629.

D. Chiba et al.; Magnetization vector manipulation by electric fields, Nature, Sep. 25, 2008; p. 515-518, vol. 455; Macmillan Publishers Limited (Discussed in p. 2 of the spec).

Yoichi Shota et al.; Induction of coherent magnetization switching in a few atomic layers of FeCo using voltage pulses; Nature Materials; Nov. 13, 2011; p. 39-43; vol. 11; Macmillan Publishers Limited (Discussed in p. 2 of the spec).

Wolfgang Kleemann; Switching magnetism with electric fields; Physics 2; Dec. 14, 2009; vol. 105; American Physical Society (Discussed in p. 2 of the spec).

Pavel Borisov et al.; Magnetoelectric Switching of Exchange Bias; Physical Review Letters; Mar. 25, 2005; p. 117203-1-117203-4; vol. 94; American Physical Society (Discussed in p. 2 of the spec).

Xi He et al.; Robust isothermal electric control of exchange bias at room temperature; Nature Materials; Jun. 20, 2010; p. 579-585; vol. 9 (Discussed in p. 2 of the spec).

Ning Wu et al.; Imaging and Control of Surface Magnetization Domains in a Magnetoelectric Antiferromagnet; Physical Review Letters; Feb. 25, 2011; p. 087202-1-087202-4; vol. 106; American Physical Society (Discussed in p. 2 of the spec).

Xi Chen et al.; Magnetoelectric exchange bias systems in spintronics; Applied Physics Letters; 2006; article No. 202508; vol. 89 (Discussed in p. 3 of the spec).

* cited by examiner

Fig. 1C

Free Energy

$F = F_0 + \sigma_i H_i + \rho_i E_i$
$+ 1/2 \chi_{ij} H_i H_j + 1/2 \chi'_{ij} E_i E_j + \alpha_{ij} E_i H_j$ $F^+ = 1/2 \chi_{ij} H_i H_j + 1/2 \chi'_{ij} E_i E_j + \alpha_{ij} E_i H_j$
$F^- = 1/2 \chi_{ij} H_i H_j + 1/2 \chi'_{ij} E_i E_j - \alpha_{ij} E_i H_j$ $F^+ - F^- = 2\alpha_{ij} E_i H_j$ $|E_i H_j| \approx 50 [\text{kOe} \cdot \text{kV/cm}] @ 290K$ $H \cdot E < 0 \Rightarrow F^+$   $H \cdot E > 0 \Rightarrow F^-$

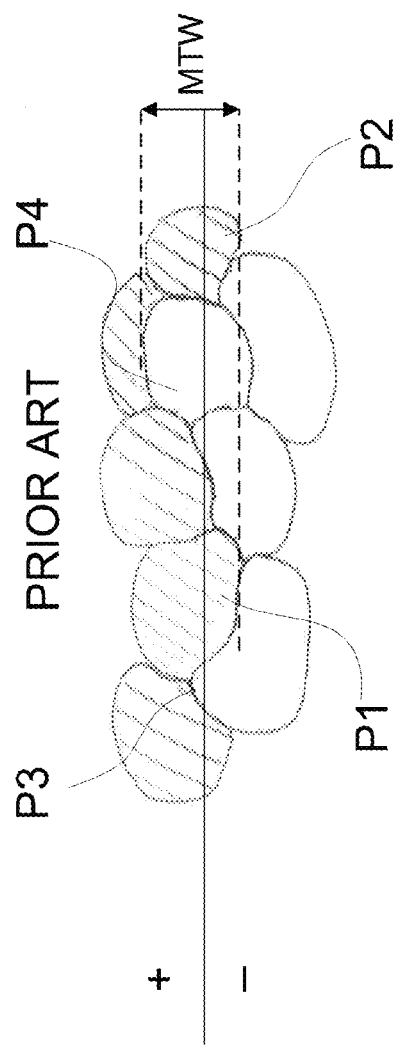
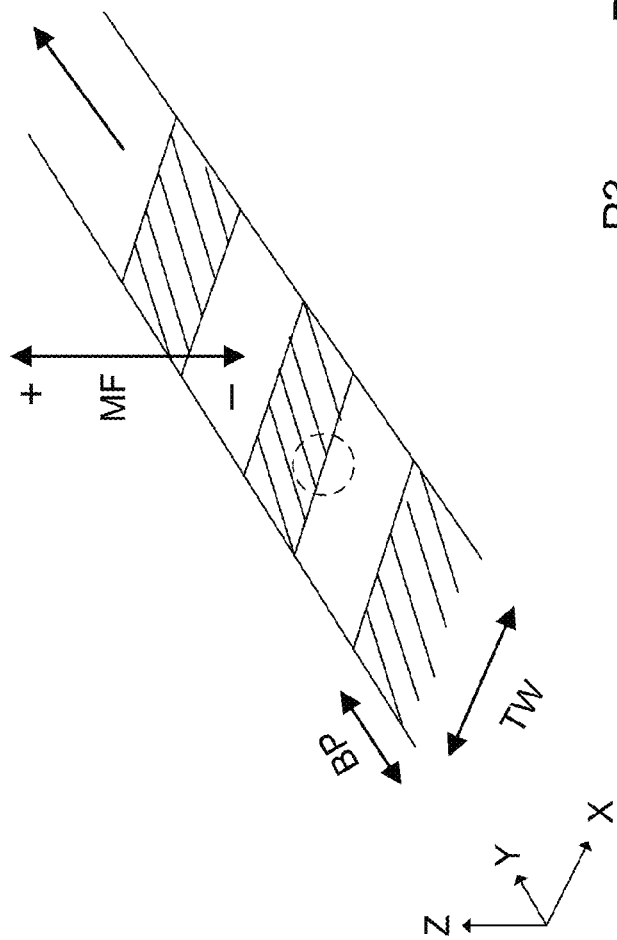
Fig. 2A PRIOR ART
Fig. 2B PRIOR ART

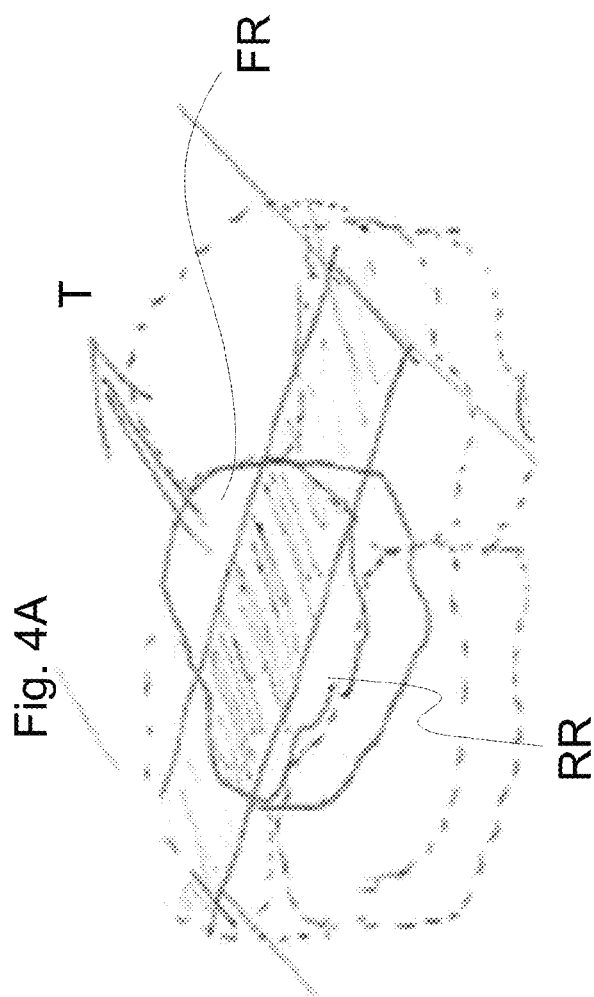
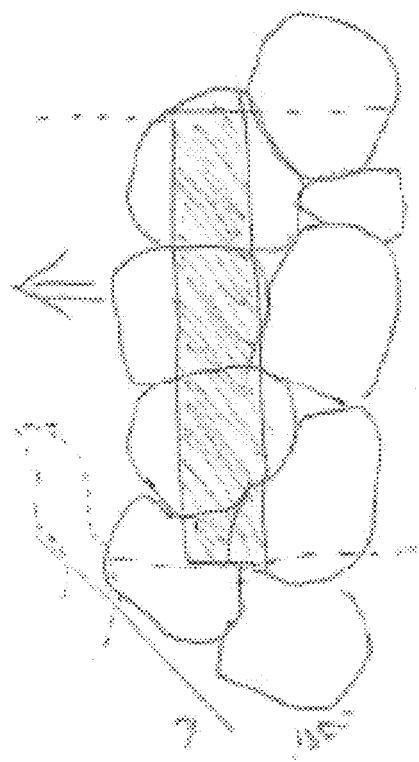
Fig. 4A
Fig. 4B (Record Medium Side)

(Holding Substrate Side)

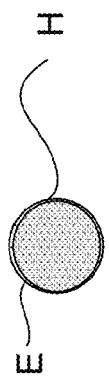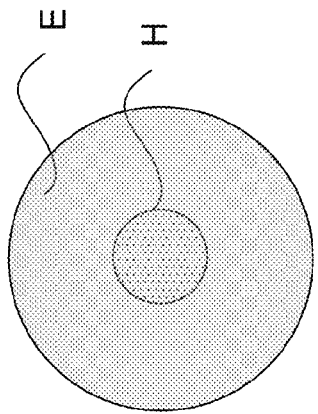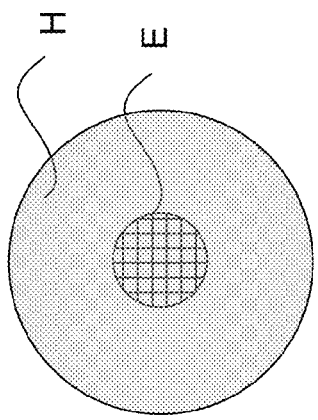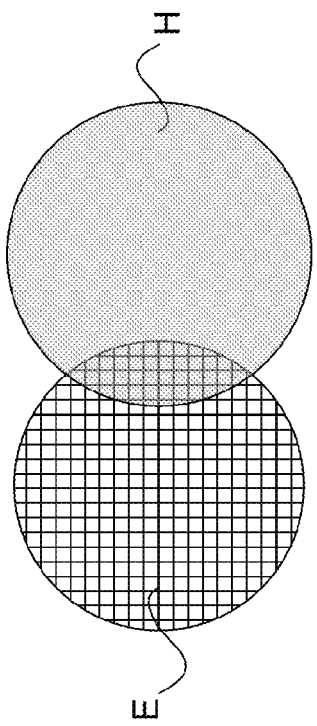

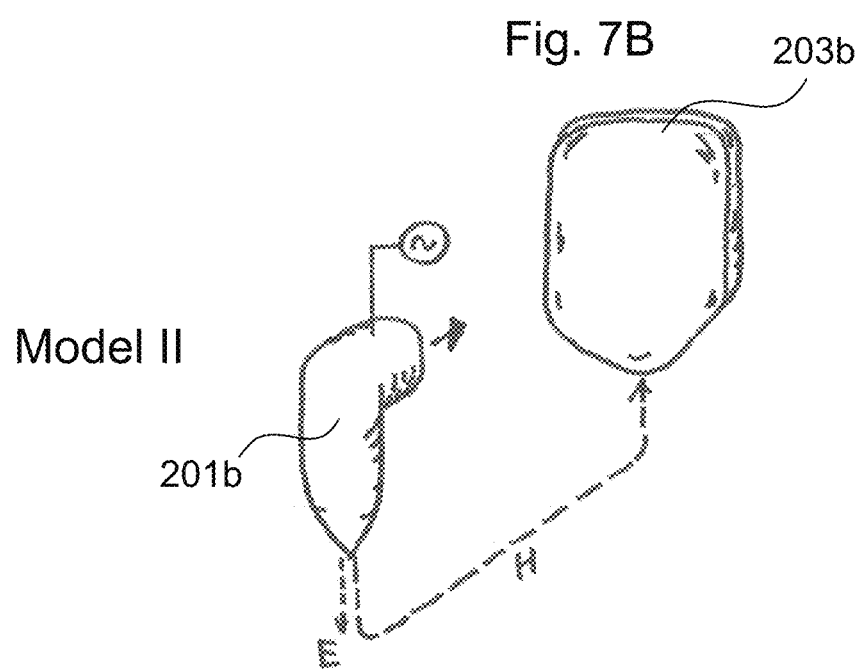

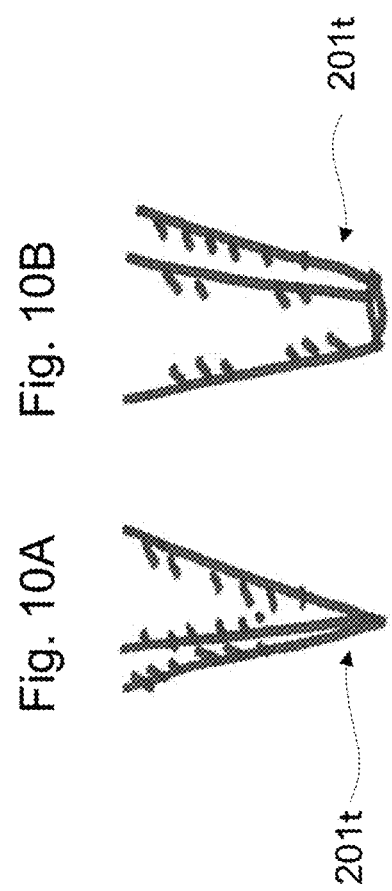

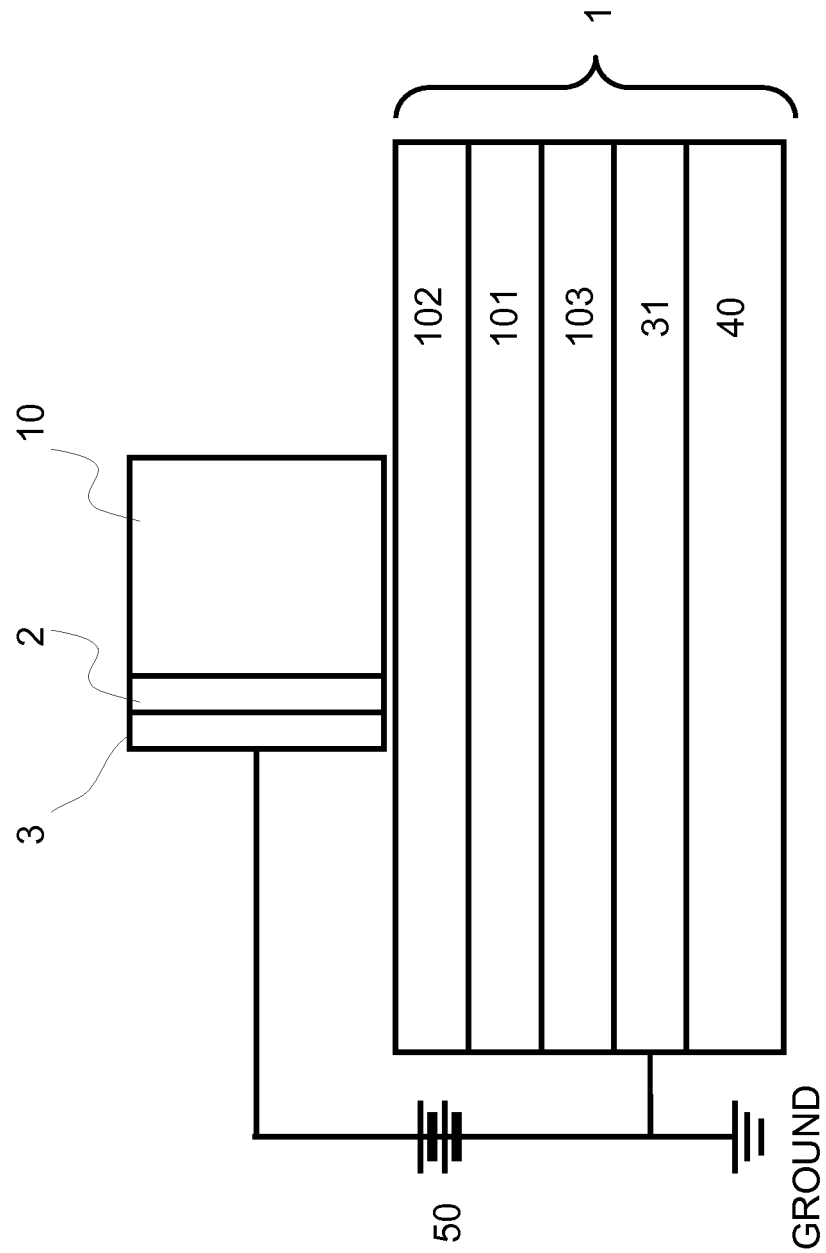

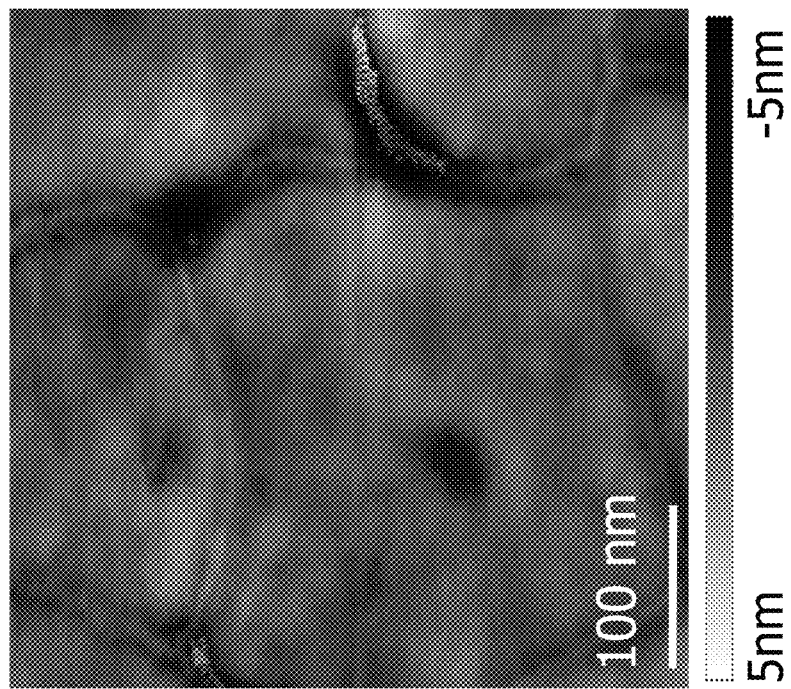
Fig. 13A Topographic image

Magnetic image

Before

Magnetic image

After

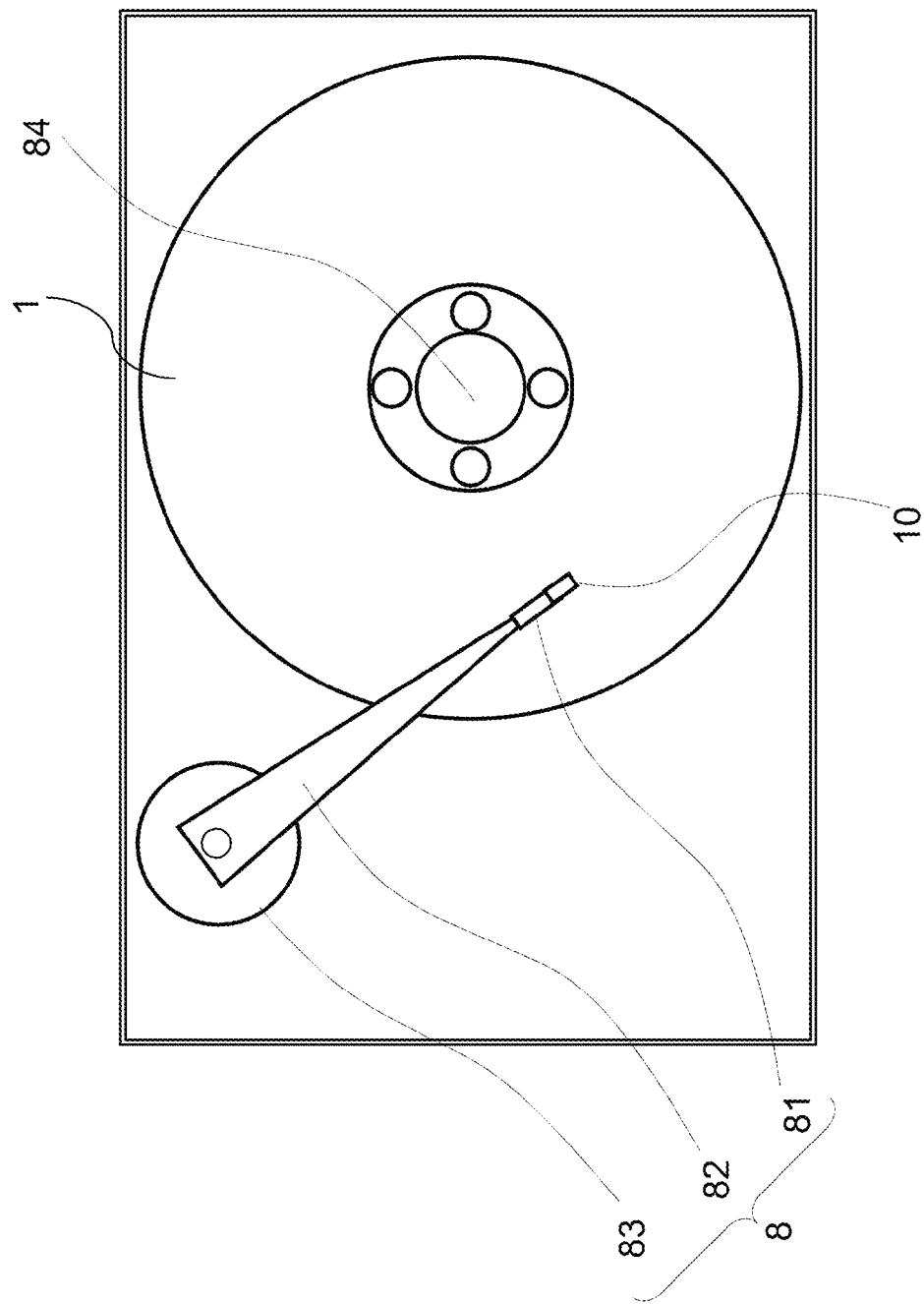

MAGNETIC RECORDING SYSTEM AND MAGNETIC RECORDING DEVICE

The present application is a Non-provisional patent application claiming the domestic priority of U.S. provisional patent application No. 61/614,646, filed on Mar. 23, 2012, the disclosure of which is incorporated herein by reference.

BACKGROUND

It is expected that the demand for the higher capacity of magnetic recording system has been increased as the development in computer network goes on. The development in the computer network is especially the increase in the variety of uses for large-scale data centers that are compatible with crowd computing. To meet the demand for the higher capacity of hard disks, which are one of the magnetic recording system, may also be a response to the demand for energy-saving. This is because, in the case of hard disks, power consumption per recording capacity can be decreased due to the higher capacity although it has been assumed that the larger-scale data center may cause power shortage.

In hard disks, an aggregation of fine ferromagnetic crystalline grains is treated as one recording bit. Each of the ferromagnetic crystalline grains is a single magnet. Therefore, in order to perform preferable high density recording with less noise, it is necessary to make the ferromagnetic crystalline grains more minute simultaneously with making the area of the recording bit smaller. For example, when the recording density is 10 Gbit/in$^2$, the size of a unit recording bit is approximately 200×300 nm$^2$; when the recording density is 100 Gbit/in$^2$, the size is approximately 75×100 nm$^2$; and when the recording density is 1 Tbit/in$^2$, the size is 20×30 nm$^2$, which is an extremely minute size.

In contrast, it has been known that thermal stability of ferromagnetic characteristic decreases due to the decrease in a grain size in the case when the ferromagnetic crystals are made more minute. In order to stably hold magnetic data (net magnetization and its direction), the product of magneto crystalline anisotropy (Ku) and volume of ferromagnetic crystals (V) have to be a sufficiently large value with respect to a fluctuation factor of heat (KuV/KbT>40-60; herein Kb: Boltzmann constant, T: absolute temperature). Therefore, in order to make the ferromagnetic crystals more minute while erasure of magnetic data due to heat is prevented, it is effective to use a magnetic material with large magnetic anisotropy energy. However, when the magneto crystalline anisotropy energy is increased, coercive force (Hc) is increased as well. Therefore, in order to operate reversal of a magnetization thereof, an even larger writing magnetic field is needed. On the other hand, in a recording head of a magnetic field writing type, which is currently used, the value of saturation magnetic flux density (Bs) of a soft magnetic material used for a magnetic pole reaches 2.4 T, which is close to physical limitation. So, it is difficult to generate further larger writing magnetic field, and a problem that magnetic data cannot be written to a recording medium with high coercive force has occurred.

As described above, the conventional magnetic recording principle, which is a system that operates a state of a recording magnetization (spin) using an external applied magnetic field, faces a substantial issue that is saturation of writing magnetic field intensity of a recording head, in addition to the difficulty of focusing a magnetic field on a local space. It is assumed that the increase in the recording capacity eventually reaches its limit with the conventional method that attempts to realize the increase in the recording capacity by making the ferromagnetic crystals, which is the medium, more minute.

In contrast, a technology has been proposed that writing to a high coercive force recording medium is performed by superimposing additional assist energy such as thermal energy and microwave from external in addition to applying a magnetic field. Thermal-assisted magnetic recording is a technique for performing writing by locally heating particulate recording medium using laser to decrease effective coercive force only during writing. Also, a microwave-assisted magnetic recording is a technology in which a magnetic recording medium is irradiated with high frequency microwave to decrease an effective recording magnetic field due to precession of a recording magnetic moment so that reversal of the recording magnetization is made easy. Both of these technologies are for compensating the lack of a reconrding magnetic field strength from a recording head with respect to a medium with high coercive force, and cannot be an essential solution. Furthermore, in these technologies, since a generation apparatus that generates laser light for heating, an optical waveguide, or a high frequency microwave oscillation apparatus necessary for magnetic resonance is required, there are problems that a thermal design or a configuration of the device is made complicated and further necessary energy consumption during writing is increased.

In order to meet the social needs of the large capacity of recording data and continue to realize a sustainable increase in the magnetic recording capacity, it is necessary to establish a technique that resolves trilemma of magnetic recording that is caused by a necessity of simultaneously realizing the decrease in an area of a recording bit and further minuteness of ferromagnetic grains. Now, several fundamental researches that follow the direction have advanced.

For example, in recent years, a magnetization control method using an electrical means, which is different from magnetization control using only an applied magnetic field, has been getting attention. For example, in WO 2009/133650 (Osaka University); D. Chiba et. al., Nature, 455,515 (2008) (Tohoku University); and Y. Shiota, Nature Materials, 11, 39 (2012) (Osaka Universit), a means that controls magnetic anisotropy of a ferromagnetic metal using an electric field effect has been proposed. Also, in JP Laid-Open Patent Application No. 2007-265512 (Hitachi), a means that controls magnetic characteristics of a magnetic semiconductor using an electrical field effect is proposed. Also, in JP Laid-Open Patent Application No. 2004-342183, JP Laid-Open Patent Application No. 2001-196661 (Sony), and WO 95/22820 (Philips), a means that controls exchange interaction using potential change caused by applying an electric field is proposed, and herein the exchange interaction functions between two ferromagnetic layers.

In contrast, a means that operates magnetic characteristics using electric filed or operates electric characteristics using magnetic field by using a magneto electric effect (hereinafter, to be referred to as ME effect), which is cross correlation of electricity and magnetism, has also been proposed. In the prior art literature, W. Kleemann, Physics, 2, 105 (2009), a magnetic recording head that performs writing using change in magnetic moment caused by the ME effect is proposed. However, the change amount of magnetic moment induced by the ME effect is still limited, and it is difficult to cause sufficiently large change in moment reversal in a magnetic recording medium, etc., to use it for a writing head of a magnetic recording device.

As another means that is different from the above-described means, an attempt to control the strength and direction of exchange-coupling existing between an antiferromagnetic material and a ferromagnetic material using the ME effect is reported. (P. Borisov et. al., Phys. Rev. Lett., 94, 117203 (2005) and H. Xe et. al., Nature Materials, 9, 579 (2010)). FIG. 1A shows a basic structure of $Cr_2O_3$, which is an antiferromagnetic oxide; FIG. 1B is a schematic view that shows two antiferromagnetic states (Type 1 and Type 2) that $Cr_2O_3$ can take; and FIG. 1C shows respective free energy of the two antiferromagnetic states. Regarding the free energy, this application incorporates references, I.E. Dzyaloshinskill, SOVIET PHYSICS JEPT-USSR, 10, 628 (1960), T. J. Martin et at, IEEE Trans. Magn., MAG-2, 446 (1966). $Cr_2O_3$ is a typical ME material that accompanies breaking of space-inversion symmetry & time-reversal symmetry, and spins existing in Cr atoms are lined in the c axis direction. The antiferromagnetic state (Type 1) shown on the left side of the figure and the antiferromagnetic state (Type 2) shown on the right side of the figure generate unidirectional anisotropy (exchange bias) whose direction is 180 degree different from each other in an adjacent ferromagnetic layer. When no external field exists, the energy states (Types 1 and 2) are equivalent. Also, when only either one of an electric field and a magnetic field exists as an external field, energy difference does not occur as well. However, when both an electric field and a magnetic field simultaneously act as external fields, the energy difference between the states occurs in proportion to a product of both of the external fields. For example, the prior art literature N. Wu et. al., Phys. Rev. Lett., 106, 087202 (2011) describes that it is possible to operate an existence probability of either one of the antiferromagnetic states by simultaneously applying an electric field and a magnetic field to an epitaxial thin film of $Cr_2O_3$. Also, in the prior art literature, X. Chen, Appl. Phys. Lett., 89, 202508 (2006), and U.S. Pat. No. 7,719,883 B2, a device like a so-called magnetoresistive random-access memory (MRAM) is proposed. The device realizes two different resistive states in a magnetic resistive element such as a spin valve, a TMR element, etc. by switching the two antiferromagnetic states with each other to reverse the direction of an exchange bias acting on an adjacent ferromagnetic layer. However, the previous proposals are made assuming that magnetizations in an entire region of a ferromagnetic layer adjacent to the antiferromagnetic layer part are operated all at once by exchange-coupling as the direction of a magnetization of a pinned layer configuring a MRAM is operated. In other words, a way of selectively operating only magnetizations in an arbitrary region of an antiferromagnetic layer adjacent to an antiferromagnetic layer and a way of making a region to be operated more minute are not considered.

In contrast, in a magnetic recording device such as a hard disk drive, recording of magnetic data is performed by selectively operating the direction of a magnetization in an arbitrary region. In order to further develop the higher density recording that the limitation of the conventional type magnetic recording system such as the above-describe trilemma has been pointed out, a recording technology that can form a recording bit without being influenced by the size of crystalline grains of a ferromagnetic material configuring a magnetic recording medium or the presence of a grain boundary is needed.

FIGS. 2A and 2B are schematic views of a conventional recording method. Here, a method of a perpendicular recording system that applies a magnetic field in the direction perpendicular to a surface of a disk medium is shown. FIG. 2A is an enlarged view of the surface of the disk medium. MF in the figure indicates a magnetization direction, and plus and minus directions are shown by an arrow. The direction corresponds to Z axis direction in the figure. TW denotes a track width of a bit. BP denotes a bit pitch and corresponds to Y axis direction in the figure. Note, a movement direction of the disk medium corresponds to Y axis direction. Also, a situation of an array of bits (recording cells) magnetized in plus and minus directions corresponding to the applied magnetization is shown. In the figure, bits with diagonal lines are magnetized in the plus direction, and bits with blank space mean a magnetization of minus. FIG. 2B is an enlarged view of the circle portion shown by a broken line in FIG. 2A, which is a boundary between plus bits and minus bits. The solid line shown in the center of the figure indicates an actual boundary of an applied magnetic field for writing. It can be said that a state in which magnetization states of bits transit along the boundary is an ideal state. However, the magnetized direction of an actual magnetization is determined by each crystal grain unsteadily existing on the boundary, and therefore crystal grains existing in a manner of covering over the boundary may be partially magnetized in a direction opposite to the original direction. As an example, in the figure, P1 and P2 are originally regions (recording cells) that should be magnetized in the minus direction, but are magnetized in the plus direction. P3 and P4 are originally regions that should be magnetized in the plus direction, but are magnetized in the minus direction. As described above, in the conventional method, the magnetization direction of each grain is changeable, so that detail observation of the magnetization transition region shows that there are some regions of which magnetization directions don't correspond to a general magnetization direction. This width is defined as a magnetic transition width (MTW), and the existence of this width may cause a noise and prevent the high recording density. In order to prevent this phenomenon, a recording method is needed that creates regions of which magnetizations reverse along the boundary of an actual magnetization even in the internals of crystal grains, but don't reverse by each crystal grain.

SUMMARY

A magnetic recording system disclosed in the present application includes at least a recording medium and a recording head. Also, the magnetic recording system disclosed in the present applying has an electric field applying device and a magnetic field applying device to simultaneously apply an electric field and a magnetic field to the recording medium during data recording. Herein, "simultaneously apply an electric field and a magnetic field" means that a portion where an electric field and a magnetic field are superimposed is transitorily formed in the recording medium.

One characteristic of the magnetic recording system disclosed in the present application is a structure of a recording medium to be used. The recording medium includes at least a first recording medium layer, a second recording medium layer, and a substrate. The substrate has a function of holding the first recording medium layer and the second recording medium layer. It is preferred that the first recording medium layer is held to be positioned on the substrate side with respect to the second recording medium layer. The first recording medium layer has at least one of an antiferromagnetic material having the ME effect and a ferrimagnetic material having the ME effect. Note, in the present application, properties of the antiferromagnetic material and the ferrimagnetic material are close to each other when the two are distinguished by the way of array of spins, so the ferrimagnetic material having the ME effect is considered as one type of the antiferromagnetic material. The second recording medium layer includes a ferromagnetic thin film for generating a large magnetization necessary for transferring and reading magnetic data recorded in the first recording medium layer.

The magnetic recording system disclosed in the present applying has the electric field applying device that applies an electric field to the recording medium and the magnetic field applying device that applies a magnetic field. One of or both the electric field applying device and the magnetic field applying device is (are) given the function of moving to an arbitrary position on the recording medium surface. Also, one of or both the electric field applying device and the magnetic field applying device may have the function of controlling the applying direction of an electric field and/or a magnetic field. One of or both the electric field applying device and the magnetic field applying device may be included in the recording head. Therefore, the recording head is arranged in the position facing the recording medium.

The recording medium of the magnetic recording system disclosed in the present application is explained.

The recording medium layers (including at least the first and second recording medium layers) provided on the substrate are preferably continuous films on at least a most surface part (side opposite to the direction of the substrate). On the side of the substrate, the recording medium layers may be formed as separated discontinuous films.

An antiferromagnetic thin film included in the first recording medium layer preferably includes at least one of $\alpha\text{-}Cr_2O_3$, $YMnO_3$, and $BiFeO_3$.

The first recording medium layer may include a thermally stable antiferromagnetic material not having the ME effect in order to increase thermal and magnetic stability of magnetic data recorded in the medium part. At this time, the Néel temperature of the antiferromagnetic material not having the ME effect is preferably higher than the Néel temperature of the antiferromagnetic material having the ME effect included in the first recording medium layer.

An antiferromagnetic material not having the ME effect preferably includes one of an antiferromagnetic metal and an antiferromagnetic oxide that include at least one transition metal element.

A lamination structure made of the antiferromagnetic material having the ME effect and the antiferromagnetic material not having the ME effect may be applicable. Also, a mixture structure made of the antiferromagnetic material having the ME effect and the antiferromagnetic material not having the ME effect may also be applicable. The structure may be a structure in which the antiferromagnetic material not having the ME effect dispersed in the antiferromagnetic material having the ME effect. A lamination form of the antiferromagnetic material may be formed by laminating this mixture to be used as the first recording medium layer.

The ferrimagnetic thin film included in the first recording medium layer preferably includes $Ga_{1-x}Al_xFeO_3$ ($0 \leq x \leq 1$) having the ME effect.

The first recording medium layer may include a thermally stable antiferromagnetic material not having the ME effect in order to increase thermal and magnetic stability of magnetic data recorded in the medium part. At this time, the Néel temperature of the antiferromagnetic material not having the ME effect is preferably higher than the Curie temperature of the ferrimagnetic material having the ME effect.

A lamination structure made of the ferrimagnetic material having the ME effect and the antiferromagnetic material that does not have the ME effect may be applicable. Also, a mixture structure in which the ferrimagnetic material having the ME effect and the antiferromagnetic material that does not have the ME effect are mixed may be applicable. The structure may also be a structure in which the antiferromagnetic material that does not have the ME effect dispersed in the ferrimagnetic material having the ME effect. A lamination structure of the antiferromagnetic material may be formed by laminating this mixture material to be used as the first recording medium layer.

The second recording medium layer preferably includes a ferromagnetic thin film. At this time, the ferromagnetic thin film preferably includes at least one of a soft magnetic metal, a hard magnetic metal, and a ferromagnetic metal oxide that include at least one of Ni, Co, Fe and Mn.

The recording medium may further include a third recording medium layer. At this time, the third recording medium layer is preferably positioned on the substrate side with respect to the first and second recording medium layers. The third recording medium layer is preferably made of a material with a function of forming a circuit for magnetic flux for writing. Such material is preferably a soft magnetic metal or a soft magnetic metal oxide that includes at least one of Ni, Co, Fe and Mn.

The magnetic recording system disclosed in the present application includes the device that applies electric field and the device that applies magnetic field for simultaneously applying an electric field and a magnetic field to the recording medium. The simultaneous application of an electric field and a magnetic field as described above means that a portion where an electric field and a magnetic field are superimposed is transitorily formed in the recording medium. For the formation of the superimposition portion of an electric field and the magnetic field in the recording medium, a method that a magnetic field is locally applied when an electric field has already been applied, and a method that an electric field is locally applied when a magnetic field has already been applied, are described as examples.

There are several variations of such combination of the electric field applying device and the magnetic field applying device, from which the combination can be selected. Typical embodiments of the variations are described as examples.

A common characteristic is a switching function that the recording head switches an electric field and/or a magnetic field. The recording head switches an electric field and/or a magnetic field so as to switch a state where an electric field and a magnetic field applied to the recording medium are almost parallel and a state where the electric field and the magnetic field are almost antiparallel with each other. By this switching function, various magnetic states are recorded in the ferromagnetic layer of the recording medium.

Therefore, the recording head includes the electric field applying device and/or the magnetic applying device. The electric field applying device has the function of spatially limiting and applying an electric field, and the magnetic field applying device has the function of spatially limiting and applying a magnetic field. At this time, the magnetic field applying device of the recording head may be a permanent magnetic. And the magnetic field applying device of the recording head may have a structure formed with a coil for flowing a current and a yoke (magnetic needle) for focusing magnetic flux.

(1) The recording head may be a type that includes both the electric field applying device and the magnetic field applying device. The electric field applying device may be formed with an electrode formed in the recording head, a power source connected between the electrode and the recording medium, and a ground connected to the recording medium. The third recording medium layer may be used as an electrode connected to the recording medium when the recording medium includes the third recording medium as described above.

(2) A form where the recording head includes the magnetic field applying device and the recording medium includes the electric field applying device may be applicable. When the recording medium includes the third recording medium layer as described above, the third recording medium layer may be used as the electric field applying device. At this time, the electric field applying device may be formed with an electrode connected to the second recording medium layer, an electrode connected to the third recording medium layer, a power source connected between the electrodes, and a ground connected to one of the electrodes.

According to the magnetic recording system of the present application, a region to which magnetic data is written is a region to which an electric field and a magnetic field are applied in a superimposition manner. The region is a region where an exchange bias of the antiferromagnetic layer is reversed, and the magnetization reversal phenomenon of the ferromagnetic layer is concentrated in this region and is substantially limited. This is because the magnetization reversal due to the ME effect may be operatable independently of the size of crystal grains of the ferromagnetic layer. As a result, magnetic data recording independently of the size and shape of the crystal grains of the ferromagnetic crystal configuring the recording medium becomes possible. In this case, as the necessity for making the crystal grains more minute is decreased, it becomes possible to realize high density recording without losing thermal stability of the ferromagnetic crystals (without changing to superparamagnetism). Specifically, the followings are described.

(i) It becomes possible to perform magnetic recording to a region that is smaller than the crystal grain size of the ferromagnetic material configuring the magnetic recording medium. Specifically, it becomes possible to write two or more magnetic data in one piece of the ferromagnetic crystal.

(ii) Even when a writing region exists covering over two or more ferromagnetic crystals, it becomes possible to form a recording bit in a preferred region independently of the existence of grain boundaries.

(iii) Because writing is performed by applying an electric field and a magnetic field, it becomes possible to suppress energy loss due to Joule heat. Therefore, energy saving of recording energy is realized.

BRIEF DESCRIPTION OF THE DRAWINGS

FIG. 1C is a schematic view describing the relationship of free energy of the two antiferromagnetic states (Type 1 and Type 2).

FIGS. 2A and 2B are schematic views of a conventional recording method.

FIGS. 4A to 4C are schematic views of a recording method of the present application.

FIGS. 5A to 5K are schematic views showing forms that a recording medium layer 1 may take.

FIGS. 6A to 6D show four applying models of a magnetic field and an electrical field.

FIGS. 7A and 7B are schematic views showing typical basic configurations of a ME recording head.

FIGS. 10A and 10B show embodiments of the tip end part of the recording pole.

FIG. 11 is a schematic view showing a portion of a data recording system according to a first example.

FIG. 13A is a topographic image of a simulated recording medium according to the first example by an atomic force microscope (AFM)

FIG. 18 is a schematic view of a movement mechanism of a recording head.

DETAILED DESCRIPTION OF THE EMBODIMENTS

The present invention provides (a) a magnetic recording device that realizes an arbitrary recording shape/area regardless of the shape of crystalline grains of a ferromagnetic material and achieves the higher density of magnetic data, and (b) a magnetic recording system using the magnetic recording system.

(Overall Configuration and Principle of Writing and Reading)

Figure 1B:
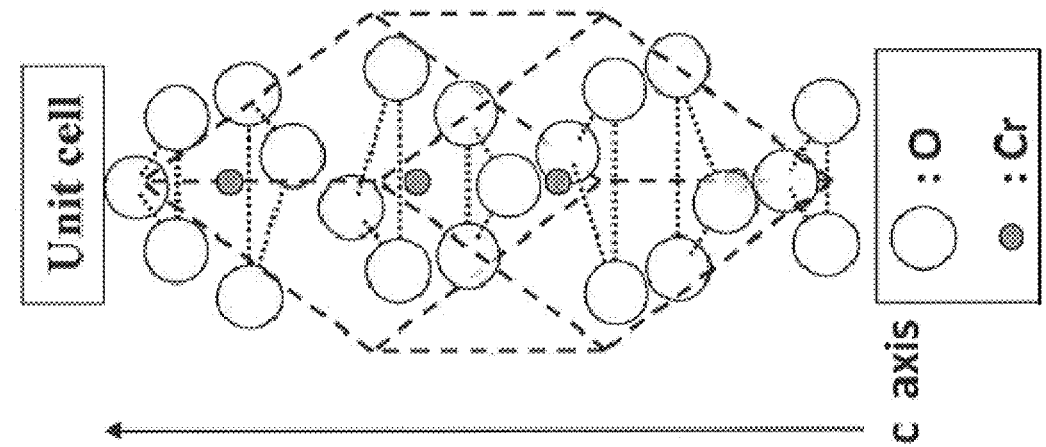
FIG. 1B is a schematic view showing two antiferromagnetic states that $Cr_2O_3$ can take (Type 1 and Type 2).
Figure 1A:
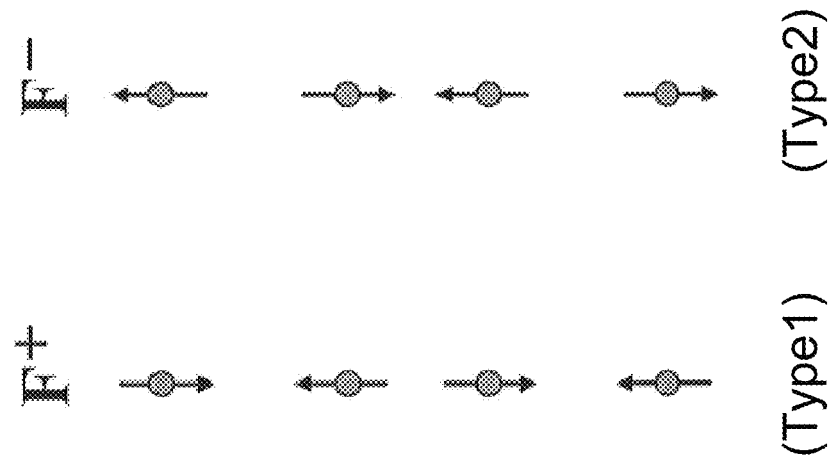
FIG. 1A shows a schematic structure view of $Cr_2O_3$, which is an antiferromagnetic oxide.
Figure 3:
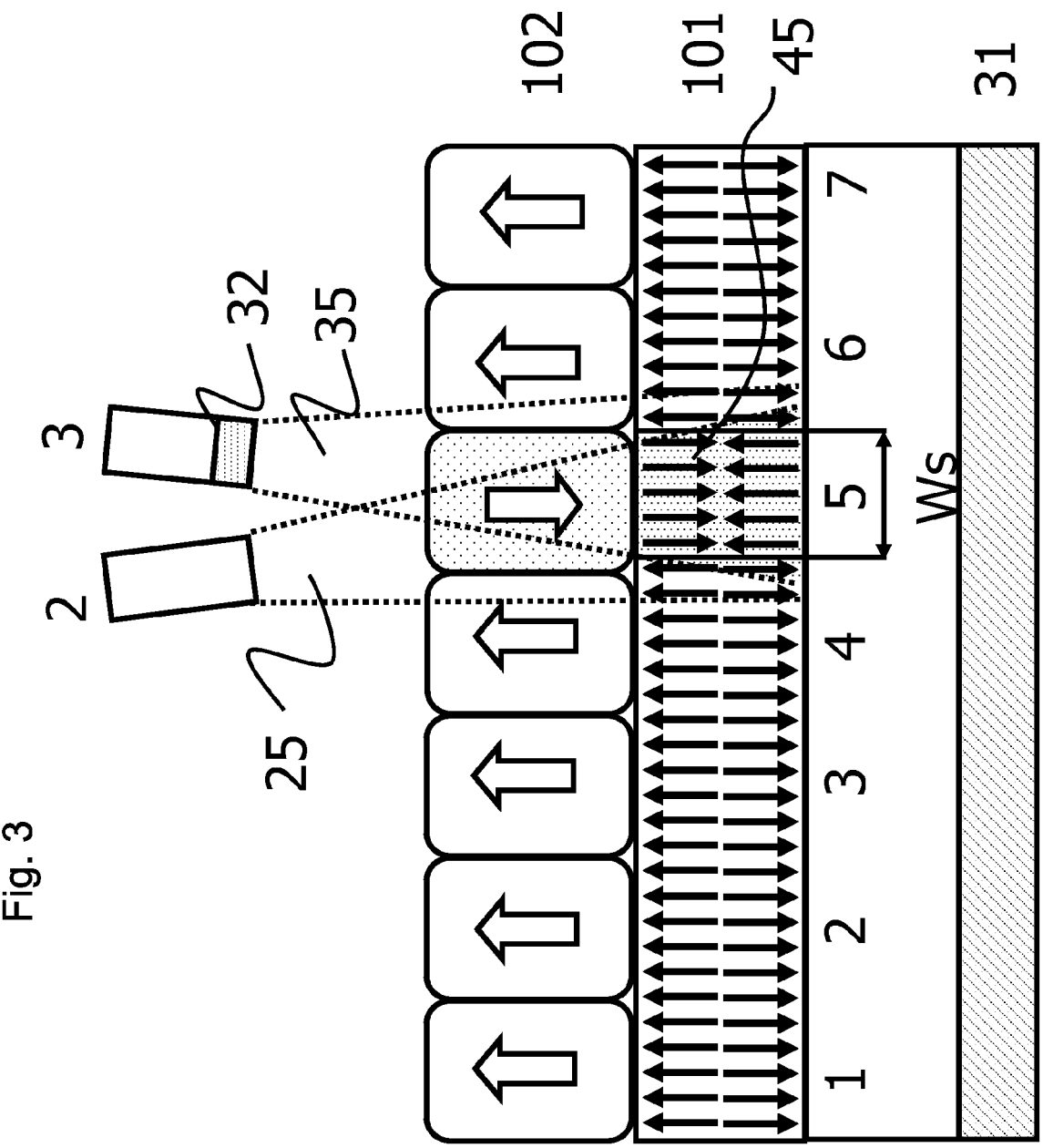
FIG. 3 is a schematic view of a configuration of the present application.

The magnetic recording device according to the present application is schematically explained using FIG. 3. Main configurations of the present application are a recording medium 1 that records magnetic data using ME effect, a magnetic field applying device 2 that applies a magnetic field to the recording medium 1, and an electric field applying device 3 that applies an electric field. The recording medium 1 has a first recording medium layer 101 that includes an antiferromagnetic layer having the ME effect and a second recording medium layer 102 that includes a ferromagnetic layer that exchange-couples to the antiferromagnetic layer. The electric field applying device 3 has two electrodes 31 and 32. When the two recording medium layers 101 and 102 are arranged between the two electrodes 31 and 32, the electric applying device 3 applies a predetermined electric field to the recording medium.

In FIG. 3, a region where a magnetic field 25 emitted from the magnetic field applying device 2 and an electric field 35 formed in the electric field applying device 3 is illustrated as a superimposition region 45. When predetermined electric field and magnetic field are given, an antiferromagnetic state of the recording medium layer 101 existing in the superimposition region 45 changes due to the ME effect. FIG. 3 shows a state where only an antiferromagnetic state of the fifth cell out of first through seventh cells has changed. The antiferromagnetic state changes in a micro level in the cells. However, because entire magnetic moments in the recording medium layer 101 cancel out each other and the layer does not have actual magnetization, it is impossible to read the antiferromagnetic state from external. Therefore, in the present application, the recording medium layer 102 configured of a ferromagnetic material that is capable of exchange-coupling to an antiferromagnetic layer is arranged in the vicinity of the first recording medium layer 101, and the antiferromagnetic state of the recording medium layer 101 is reflected to the recording medium layer 102. Thereby, the reading becomes possible. Referring to FIG. 3, the magnetization directions of the first through seventh cells except for the fifth cell in the recording medium layer 102 are upward, but the magnetization direction of the fifth cell is downward corresponding to the antiferromagnetic state of the antiferromagnetic layer. From these situations, the reading device that reads magnetic data becomes capable of reading magnetic data recorded in the recording medium layer 101 from the magnetization directions of the recording medium layer 102. In other words, in the present application, the first recording medium layer 101 is the layer to which magnetization data is written, and the second recording medium layer 102 is the layer from which magnetization data is read. Note, as long as exchange-coupling between the first and second recording medium layers is maintained, it is possible to provide another layer therebetween. In FIG. 3, the magnetic field 25 and electric field 35 to be applied are not completely in parallel, and the magnetic field 25 and the electric field 35 may be slightly inclined. It is not an issue as long as an approximately parallel or approximately antiparallel state can be formed under a situation where the ME effect is usable. The recording medium layer 101 is arranged so as to move in the superimposition region 45. By appropriately switching the magnetic field and the electric field in the superimposition region as the recording medium layer 101 moves, it becomes possible to continuously record magnetic data to the recording medium layer 101.

(Recording Region)

In the present magnetic recording method, the direction of recording magnetization in the magnetic recording medium layer is controlled by simultaneously applying an electric field and a magnetic field to the magnetic recording medium and operating the relationship of the electric field and magnetic field to be applied to be in approximately parallel or in approximately antiparallel. At this point, magnetization reversal occurs only in the region (superimposition region) to which the electric field and the magnetic field are applied in the superimposition manner. This phenomena occurs irrespective of the size of crystalline grains of the ferromagnetic material and/or the existence of a grain boundary, and realizes different directions of magnetizations in a portion and another portion of a crystalline grain. The size and width of the superimposition region is freely settable as long as magnetization change can be recorded to the first recording medium layer 101. In the perspective of increasing the recording density, it is preferred to be minute to the extent possible. When an antiferromagnetic material disclosed in the present specification is used for the first recording medium layer 101, the above-described width Ws (superimposition region width) should be in a range of 1 nm-200 nm in the direction of a track width TW (X-direction) of the recording medium. It is possible to specify the superimposition region width by measuring the width of the magnetization region (fifth of the layer 101 in FIG. 3) recorded in the first recording medium or the cell (fifth of the layer 102) of the second recording medium layer that exchange-couples to the magnetization region. Note, it is also possible to specify the size of the superimposition region by its area not its width. According to the embodiment of the present application, the area is in a range of 5 $nm^2$-10,000 $nm^2$.

Figure 4C:
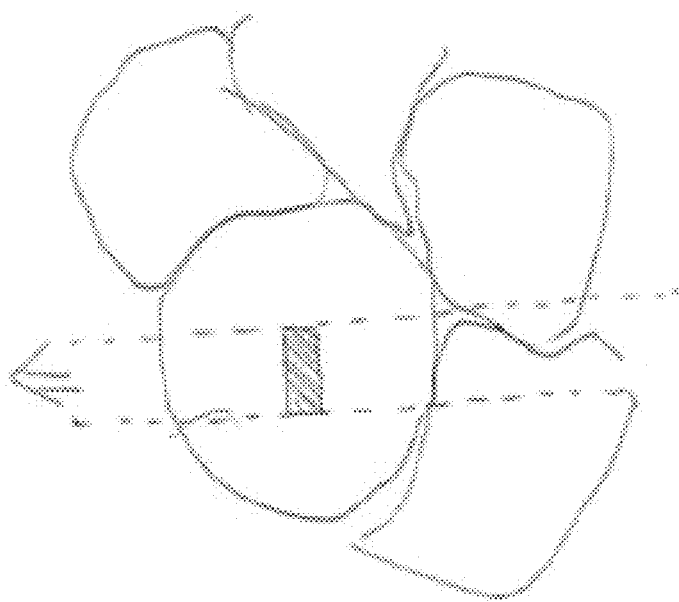

FIG. 4A is a schematic view of a method of recording to a single crystal grain. The figure shows a state where both a magnetic field and an electric field are applied to one grain of a ferromagnetic crystal. In the figure, the application is performed in a parallel situation. A frame in the figure is a magnetization region. According to the recording method, a magnetic region is not determined by the size of crystalline grains and/or the presence of a grain boundary. Only a center region of the grain is in the magnetization region, and a fore region FR and a rear region RR, which are respectively in a fore side and a rear side with respect to the medium movement direction T, are not in the magnetization region. Note, hereinafter in the present application, "magneto electric recording (ME recording)" is defined as "a recording method that operates a magnetization direction of a magnetic recording medium by superimposing an electric field and a magnetic field on each other to the magnetic recording medium to reverse one of an electric field and a magnetic field." FIG. 4B is an imaginary view of an actual medium surface, and a plurality of crystal grains is arranged. In the recording method, because magnetization is not performed by grains and a grain can be partially magnetized, one magnetization region is formed when respective portions of the plurality of grains are connected in an array. FIG. 4C is a view in which a magnetization region is made even smaller. As illustrated in the figure, by making a superimposition region even smaller, it is possible to form one or more magnetization regions in one crystal grain. In the figure, a width illustrated by two dotted lines is a track width.

In a specific form of the present magnetic recording method, a bias magnetic field and an external electric field, or a bias electric field and an external magnetic field, are applied to a disc surface of the magnetic recording medium with a ferromagnetic layer/antiferromagnetic layer to form a superimposition region where the electric field and the magnetic field are superimposed on each other. Magnetic data is recorded to the magnetic recording medium layer by arbitrarily controlling the direction of the external electric field out of these so as to be almost antiparallel to the bias magnetic field from being almost parallel and by controlling the strength of the external electric field, or by controlling the direction of the external magnetic field so as to be almost antiparallel to the bias magnetic field from being almost parallel and by controlling the strength of the external magnetic field. In this method, only in the region where the electric field and the magnetic field are superimposed on each other, the direction of a recording magnetization can be selectively controlled. At this time, a region in which a magnetization can be operated can be formed irrespective of the size of ferromagnetic crystalline grains configuring the recording medium and/or the existence of a grain boundary, and also it is possible to make the area of the superimposition region sufficiently minute. When the superimposition area is smaller than the area of a crystalline grain of the ferromagnetic material, magnetic data can be recorded by causing reversal of a magnetization only in a portion of the crystalline grain. Originally, even when crystalline grains are minute to the degree needed for the conventional recording technology, it is possible to record different plural data of magnetic data in a crystalline grain as laterally crossing the crystalline grain. Note, "superimposition" in the present application means a state where two regions completely correspond to each other, a state where two regions partially cover each other, and a state where a region is completely included by another region.

In order to efficiently perform the above-described ME recording, it is assumed that a spacing between a tip end of a ME recording head that faces the magnetic recording medium and a movement most front surface of the magnetic recording medium is to be 1 nm-50 nm.

Also, the present magnetic recording system includes (a) the magnetic recording medium with which the ME recording can be highly efficiently performed and (b) the ME recording head that can limit a region of the magnetic recording medium where reversal of a magnetization due to the ME effect occurs to a minute region that is a nanometer-scale region.

(Magnetic Recording Medium 1)

Figure 5A:
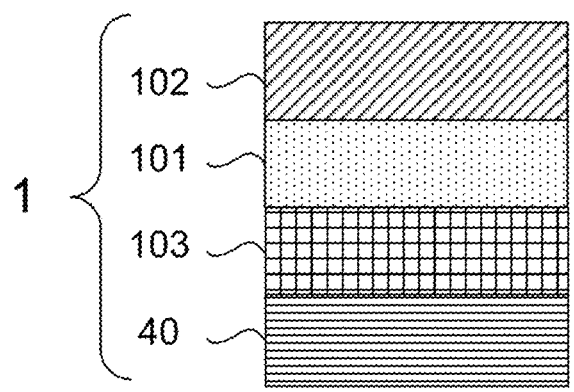
Figure 5B:
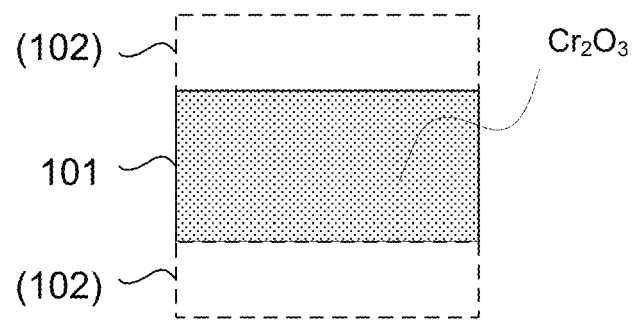
Figure 5C:
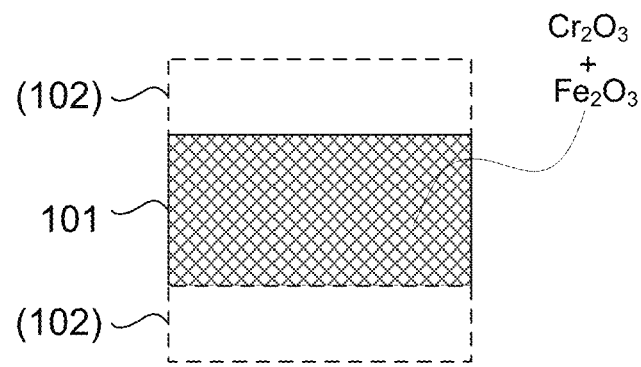

A basic sectional structure of the magnetic recording medium is illustrated in FIG. 5A. The magnetic recording medium 1 has at least three elements: the recording medium layer 101 (may also be referred to as the first recording medium layer) that is formed of an antiferromagnetic insulator for saving magnetic data; the recording medium layer 102 (may also be referred to as the second recording medium layer) that is formed of a ferromagnetic material (metal or insulator) for reading magnetic data written to the recording medium layer 101; and the substrate 40. The recording medium may further include a recording medium layer 103 (may be also referred to as a third recording medium layer) that is made of a soft magnetic material for forming a circuit of magnetic flux for writing. In that case, the recording medium layer 103 exists on the substrate side with respect to the recording medium layers 101 and 102.

(Recording Medium Layer 101)

The recording medium layer 101 has the function of writing and recording magnetic data in response to superimposition of an applied electric field and an applied magnetic field. In the writing, magnetic data is recorded by applying an external electric field in almost parallel•almost antiparallel to a bias magnetic field whose direction is pinned in one direction and by selecting an antiferromagnetic domain state of the antiferromagnetic layer. Also, it is possible to apply an external magnetic field in almost parallel•almost antiparallel to a bias electric field whose direction is pinned in one direction.

Because data recorded to the antiferromagnetic layer does not have magnetization as its entire magnetization region, it is impossible to read the data in as-recorded state. However, because the recording medium layer 102 made of the ferromagnetic material is arranged adjacent to the recording medium layer 101 to grenerate an exchange-coupling (exchange bias) between the two layers, magnetic data in the recording medium layer 101 made of the antiferromagnetic material is transferred to the recording medium layer 102 by changing the magnetization direction of the recording medium layer 102, and therefore it becomes possible to read the recorded magnetic data.

For the recording medium layer 101, a material having such function can be arbitrarily selected and used. At this point, the recording medium layer 101 may include an antiferromagnetic material with even higher Néel temperature not having the ME effect in addition to an antiferromagnetic material having the ME effect or a ferrimagnetic material having the ME effect. As a result, the strength and the thermal stability of the exchange-coupling (exchange bias) existing between the recording medium layer 101 and the recording medium layer 102 can be increased.

Figure 5D:
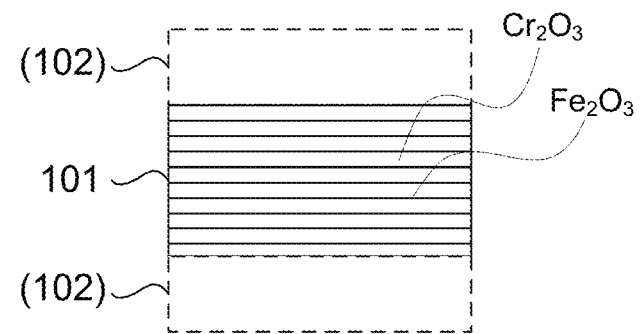
Figure 5E:
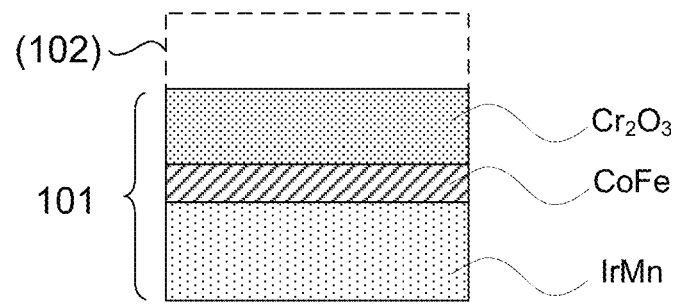
Figure 5F:
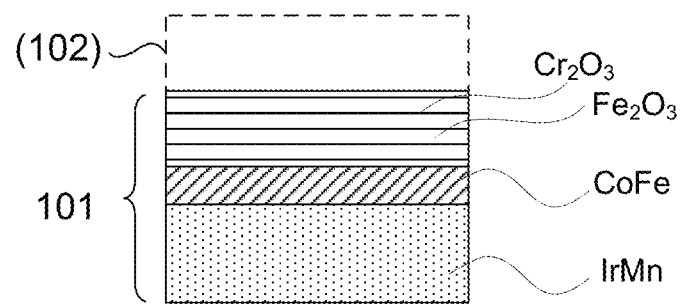
Figure 5G:
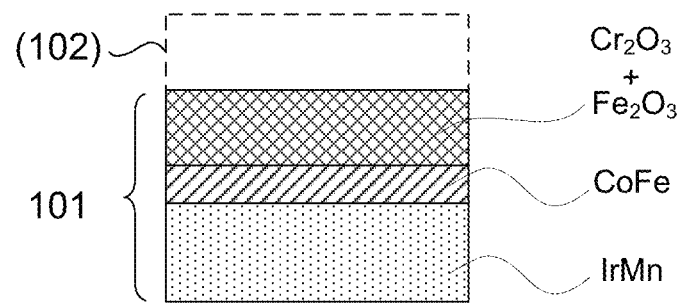

The recording medium layer 101 may take various configurations. The various configurations are illustrated in FIGS. 5B-5G. The recording medium layer 101 may be made of, for example, (a) a thin film including at least one of an antiferromagnetic oxide having the ME effect such as $\alpha\text{-}Cr_2O_3$, $YMnO_3$, $BiFeO_3$, and a ferrimagnetic oxide having the ME effect such as $Ga_{1-x}Al_xFeO_3 (0\leq x\leq 1)$ (see FIG. 5B), or (b) a mixed crystal whose primary composition is at least one of an antiferromagnetic oxide having the ME effect such as $\alpha\text{-}Cr_2O_3$, $YMnO_3$, $BiFeO_3$, and a ferrimagnetic oxide having the ME effect such as $Ga_{1-x}Al_xFeO_3 (0\leq x\leq 1)$ (see FIG. 5C). Also, (c) a lamination structure (see FIG. 5D) and a mixture structure are applicable that are made of at least one of the antiferromagnetic oxide having the ME effect and the ferrimagnetic oxide having the ME effect, which are described in the (a) and (b) above, and an antiferromagnetic material with Néel temperature higher than that of the antiferromagnetic oxide and the ferrimagnetic oxide having the ME effect. Horizontal lines of FIG. 5D illustrate a layer state where $Cr_2O_3$ and $Fe_2O_3$ are alternately stacked each other. For the antiferromagnetic material, a known antiferromagnetic material whose Néel temperature is high can be arbitrarily selected and used. Typically, an antiferromagnetic oxide such as NiO, $Fe_2O_3$, $(1-x)Fe_2O_3\text{-}xRh_2O_3$, $(1-x)Fe_2O_3\text{-}xRuO_2$, and $(1-x)Fe_2O_3\text{-}xIrI_2$ $(0<x<1)$, and an antiferromagnetic metal such as IrMn, FeMn, and PtMn can be used.

In the recording medium layer 101, in addition to the material layer of the above-described (a)-(c), a metal ferromagnetic layer and another antiferromagnetic layer may be further provided so as to be adjacent to the material layer. For example, on a side that is adjacent to the recording medium layer 101 and is not adjacent to the recording medium layer 102, the metal ferromagnetic layer and the another antiferromagnetic layer may be provided. For example, for the ferromagnetic metal layer, a CoFe alloy, a NiFe alloy, a CoFeB alloy, a ferromagnetic multilayer that is made by laminating these alloys, and a ferromagnetic multilayer that is made by depositing Cr or Pt having 2 nm or less on these ferromagnetic layers can be used. The another antiferromagnetic layer may be made of a metallic antiferromagnetic material. For example, IrMn, FeMn, PtMn, and the like can be used (see FIGS. 5E-5G). The metallic antiferromagnetic layer may have a thickness of about 1-10 nm. With such structure, the recording medium layer 101 can be thermally stabilized. In FIGS. 5A-5G, positions at which the recording medium layer 102 may be positioned are illustrated with broken lines. The substrate is arranged on the lower side with respect to the recording medium layer 101 in the figures.

The recording medium layer 101 may have a thickness of about 1 nm-1 µm.

(Recording Medium Layer 102)

The recording medium layer 102 has the function of generating a magnetic field for reading magnetic data written to the recording medium layer 101. For the ferromagnetic material of the recording medium layer, a hard magnetic metallic alloy or a hard magnetic ordered alloy can be arbitrarily selected and used. Typically, CoPt, FePt, and an alloy thereof are preferably used. Especially, CoCrPt system and CoCrPtB system can be used. In CoCrPt system, Co—Cr—Pt (in which the Cr content is 14-24 at %, the Pt content is 8-22 at %, and the remaining is Co) is preferable. In CoCrPtB system, Co—Cr—Pt—B (in which the Cr content is 10-24 at %, the Pt content is 8-22 at %, the B content is 0-16 at %, and the remaining is Co) is preferably. As other systems, in CoCrPtTa system, Co—Cr—Pt—Ta (in which the Cr content is 10-24 at %, the Pt content is 8-22 at %, the Ta content is 1-5 at %, and the remaining is Co); and in CoCrPtTaB system, Co—Cr—Pt—Ta—B (in which the Cr content is 10-24 at %, the Pt content is 8-22 at %, the Ta content is 1-5 at %, and the B content is 1-10 at %, and the remaining is Co) may be used. Also, CoCrPtBNd system, CoCrPtTaNd system, CoCrPtNb system, CoCrPtBW system, CoCrPtMo system, CoCrPt-CuRu system, CoCrPtRe system, FePtRh system, and a multilayer system of ferromagnetic/ferromagnetic and ferromagnetic/nonmagnetic system such as Co/Fe, Co/Pt, Co/Pd, etc. may be arbitrarily selected and used. The entire of the recording medium layer 102 may be a thickness of about 1-10 nm.

For the recording medium layer 102, an arbitrary soft magnetic material may be used as well. The soft magnetic material may be either amorphous or fine crystal. As the soft magnetic material used for the recording medium layer 102, a soft magnetic material with a larger saturation magnetic flux density Bs is preferable. As the soft magnetic material, a known material that shows a soft magnetic characteristic with small coercive force may be arbitrarily selected and used. For example, a cobalt based alloy such as CoTaZr, etc.; a Co—Fe alloy such as CoFe, CoFeB, CoCrFeB, FeCoN, FeCoTaZr, CoFeZrNb, etc.; a Ni—Fe alloy such as NiFe, a multilayer structure of [Ni—Fe/Sn]n, FeNiMo, FeNiCr, FeNiSi, etc.; a Co—Fe alloy such as FeCo, FeCoV, etc.; a Cr—Fe alloy such as FeCr, FeCrTi, FeCrCu, etc.; a Ta—Fe alloy such as FeTa, FeTaC, FeTaN, etc.; a FeAl alloy such as FeAlSi, FeAl, FeAlSiCr, FeAlSiTiRu, FeAlO, etc.; a FeMg alloy such as FeMgO, etc.; a FeZr alloy such as FeZrN, etc.; a FeC alloy; a FeN alloy; a FeSi alloy; a FeP alloy; a FeNb alloy; a FeHf alloy; a FeB alloy; Fe; MnZn; etc., can be used alone, or two or more types of them can be combined and used. Also, a Co based amorphous alloy that contains 80 or more at % Co and at least one of Zr, Nb, Ta, Cr, Mo, etc. can be used.

Also, the recording medium layer 102 may be a multilayer film made of the above-described hard magnetic material and soft magnetic material, or a graded composition film.

For the recording medium layer 102, an arbitrary oxide magnetic material may be used as well. The oxide magnetic material can be the one having insulation property or the one with electric conductivity. For the oxide magnetic material, a known material that shows a soft magnetic characteristic with small coercive force may be arbitrarily selected and used.

Typically, $\gamma\text{-Fe}_{2-x}\text{Cr}_x\text{O}_3 (0 \leq x < 1)$, $\text{AFe}_2\text{O}_3$ {A=Mn, Co, Ni, Cu, Zn}, $\text{RFe}_5\text{O}_{12}$ {R=rare earth element}, $\text{Fe}_3\text{O}_4$, $\text{CrO}_2$, and the like can be individually used, and also two or more of them can be combined and used.

Furthermore, the recording medium layer 102 of the magnetic recording medium may be a recording layer used for a perpendicular magnetic recording medium in an exchange-coupled composite (ECC) system. The recording layer has recording layers made of two magnetic layers (hard layer and soft layer) with different coercive force and an exchange-coupling control layer that couples the magnetic layers to each other. For example, a recording layer (upper hard layer) with large coercive force is provided as an upper layer and a layer (lower soft layer) with relatively small coercive force is provided as a lower layer. Then, the upper hard layer and the lower soft layer are coupled to each other by the exchange-coupling control layer with a structure of a conductive thin film. For the upper hard layer, a granular film that is made by simultaneously sputtering a low coercive force alloy of Co—Cr system and a nonmagnetic material such as $\text{SiO}_2$, $\text{TiO}_2$, etc. can be used. For the lower soft layer, a metal film such as Ni—Fe, etc., or the granular film of Co—Cr system, which is the same as that for the upper hard layer, can be used. For the exchange-coupling control layer, a Ru thin film or Co thin films can be used. By adjusting a film thickness of the exchange coupling control layer, a magnetic coupling between the upper hard layer and the lower soft layer can be adjusted.

In the magnetic recording medium, electric resistance of the recording medium layer 102 sometimes needs to be high. That is because it is expected that a current in a plane direction may be generated in the recording medium layer 102 because the magnetic recording system is characterized by applying an electric field to the magnetic recording medium. In the recording medium layer 102, it is possible to arbitrarily select a structure and a material according to the electric characteristic. The following structures are given as examples.

When the magnetic recording medium has a structure in which the recording medium layer 103/recording medium layer 101/recording medium layer 102 are laminated in this order in a perpendicular direction from the disc surface of the recording medium layer and the ferromagnetic layer (recording medium layer 102) is made of a material with high resistance at which an electric field necessary for ME recording is not prevented from focusing, or when it is unnecessary to regard the diffusion of the electric field as an issue because of the structure of the magnetic recording system, it is allowed to make the recording medium layer 102 of a single material.

When it is necessary to increase the electric resistance of the ferromagnetic layer (recording medium layer 102), it is possible to disperse fine insulator grains. As an insulator material, for example, $\text{SiO}_2$, $\text{Al}_2\text{O}_3$, $\text{Ta}_2\text{O}_5$, $\text{Cr}_2\text{O}_3$, MgO, $\text{Y}_2\text{O}_3$, $\text{TiO}_2$ etc. as an oxide, and AlN, $\text{Si}_3\text{N}_4$, TaN, CrN, etc. as a nitride, and TaC, BC, SiC, etc. as a carbide are usable. Also, organic fine grains such as polyethylene may be used.

When it is necessary to increase electric resistance of the ferromagnetic layer (recording medium layer 102), the ferromagnetic layer may be configured to have a so-called granular structure. For example, the recording medium layer 102 may be a ferromagnetic layer including a granular structure in which a grain boundary is made by segregating a nonmagnetic material around magnetic grains of a hard magnetic material selected from a Co based alloy, a Fe based alloy, and a Ni based alloy. As the nonmagnetic material, an oxide such as $\text{SiO}_2$, Ru—$\text{SiO}_2$, $\text{Cr}_2\text{O}_3$, $\text{TiO}_2$, $\text{Ta}_2\text{O}_5$, $\text{B}_2\text{O}_3$, $\text{Fe}_2\text{O}_3$, etc., a nitride such as $\text{Si}_3\text{N}_4$, BN, etc., or a carbide such as TaC, $\text{B}_4\text{C}_3$, etc., is preferably used. Specifically, as examples, CoCr—$\text{SiO}_2$, CoCr—$\text{TiO}_2$, CoCr—$\text{Cr}_2\text{O}_3$, CoCrPt—$\text{Ta}_2\text{O}_5$, Ru—$\text{SiO}_2$, Ru—$\text{Si}_3\text{N}_4$, Pd—TaC, etc. are given. At this time, an under layer may be provided to make a crystal of the recording medium layer 102 with an excellent orientation as the granular structure. For example, when the recording medium layer 102 has a hcp structure of Co system, as an under layer of the recording medium layer 102, Pt, Ru, RuCr, or RuCo may be provided.

It is preferred that the contents of the above-described insulator grains and nonmagnetic base material are respectively 1 mol % or more and 18 mol % or less with respect to the total amount of the magnetic material. Further preferably, they are respectively 6 mol % or more and 15 mol % or less. When the content of the insulator grain or the nonmagnetic base material exceeds the above-described range, the orientation and crystallinity of the magnetic material tend to deteriorate. When the contents are less than the above-described range, diffusion of the electric field and noise during recording and reproducing tend to increase because separation of the magnetic material is insufficient.

(Recording Medium Layer 103)

The present magnetic recording medium of the present embodiment has a soft magnetic layer as the recording medium layer 103. In the conventional perpendicular magnetic recording system, a soft magnetic layer is a layer that temporarily forms a magnetic circuit during recording. In the perpendicular recording system, a single pole type perpendicular head is used to generate a magnetic field in a perpendicular direction to a magnetic recording layer. However, when only the single pole type magnetic head is simply used, it is impossible to apply a magnetic field with sufficient intensity to the magnetic recording layer because a magnetic flux exiting from an end part of the single pole tends to immediately return to a return pole on its opposite side. In order to solve this, a soft magnetic layer is provided under the magnetic recording layer of the perpendicular magnetic recording disk to form a magnetic path for a magnetic flux in the soft magnetic layer, and thereby it is possible to apply an intense magnetic field in the perpendicular direction to the magnetic recording layer. The present magnetic recording method has a characteristic of combination of applying a magnetic field and applying an electric field, so that it is preferred to configure a magnetic path in the same way as the perpendicular magnetic recording system. Specifically, a soft magnetic under layer made of a soft magnetic material is provided on a substrate side with respect to the recording medium layers 101 and 102 to configure a magnetic path that makes a magnetic flux return to the ME recording head.

An extremely different point of the present magnetic recording medium from the medium of the conventional perpendicular magnetic recording system is that the new magnetic recording medium may receive an applied electric field from the ME recording head. In order to generate an electric field between the ME recording head and the recording medium layer 101 or between the ME recording head and the recording medium layer 102, an electrode layer at ground potential, which is to be a counter electrode, is needed. When the recording medium layer 103 is set to have the ground potential and used as an electrode layer, this requirement is met. Needless to say, an electrode layer at ground potential may be formed independently from the recording medium layer 103, and the substrate itself may be kept at ground potential as an inductive material. In such case, the recording medium layer 103 is primarily required to function as a magnetic circuit.

The recording medium layer 103 is configured of an arbitrary soft magnetic material with low electric resistance. The soft magnetic material may be either amorphous or fine crystal. A film thickness thereof is about 50 nm-2 µm. It is preferred that the recording medium layer 103 has a larger value of a product of its saturation magnetic flux density Bs and the film thickness. As the soft magnetic material, a known material that shows a soft magnetic characteristic with small coercive force may be arbitrarily selected and used. For example, a cobalt system alloy such as CoTaZr, etc.; a Co—Fe system alloy such as CoFeB, CoCrFeB, FeCoN, FeCoTaZr, CoFeZrNb, etc.; a Ni—Fe system alloy such as NiFe, a multilayer structure of [Ni—Fe/Sn]n, FeNiMo, FeNiCr, FeNiSi, etc.; a Co—Fe system alloy such as FeCo, FeCoV, etc.; a Cr—Fe system alloy such as FeCr, FeCrTi, FeCrCu, etc.; a Ta—Fe system alloy such as FeTa, FeTaC, FeTaN, etc.; a FeAl system alloy such as FeAlSi, FeAl, FeAlSiCr, FeAlSiTiRu, FeAlO, etc.; a FeMg system alloy such as FeMgO, etc.; a FeZr system alloy such as FeZrN, etc.; a FeC system alloy; a FeN system alloy; a FeSi system alloy; a FeP system alloy; a FeNb system alloy; a FeHf system alloy; a FeB system alloy; Fe; MnZn; etc., can be used alone, or two or more types of them can be combined and used. Also, a Co alloy that contains 80 or more at % Co and at least one of Zr, Nb, Ta, Cr, Mo, etc., and has an amorphous structure can be used. Especially, as a soft magnetic material whose saturation magnetic flux density Bs is 1.0 T or more, it is preferred to use FeSi, FeAlSi, FeTaC, CoZrNb, CoCrNb, NiFeNb, Co, etc.

Also, the recording medium layer 103 may be formed with two layers and have a structure in which a nonmagnetic spacer layer is positioned between the upper soft magnetic layer and the lower soft magnetic layer. For example, by disposing a spacer layer made of ruthenium (Ru), it is possible to configure the soft magnetic layers with antiferro-magnetic exchange-coupling (AFC). Therefore, it becomes possible to orient the magnetic directions of the soft magnetic layers along the magnetic path (magnetic circuit) in high accuracy. In this case, because the vertical component of the magnetic direction is extremely small, it is possible to reduce noise generated by the soft magnetic layers.

(Electrode Layer 32)

It is necessary for the present magnetic recording medium to have an electrical ground because applying an electric field is one of its characteristics. In this case, a ground end is provided in a center part of the magnetic recording medium to have electric contact with a rotation shaft (spindle). The electrical ground can be easily realized by creating another electric contact between the ground end and either the recording medium layer 103, an arbitrarily added electrode layer, or the conductive substrate. Also, a mechanism for removing or reducing noise from the ground end may be provided as needed. In the present example, the electrode layer 32 is a portion of the recording medium 1, and also configures one of a pair of electrodes of the electric field applying device.

(Arrangement of Recording Medium Layers 101-103)

Figure 5H:
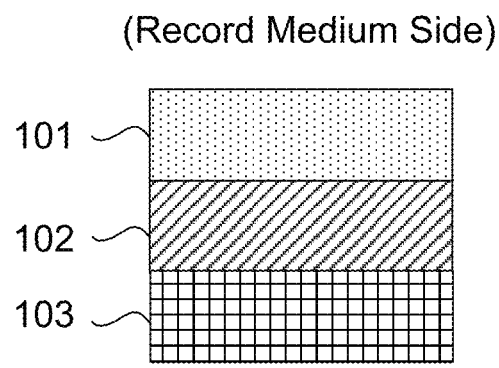
Figure 5J:
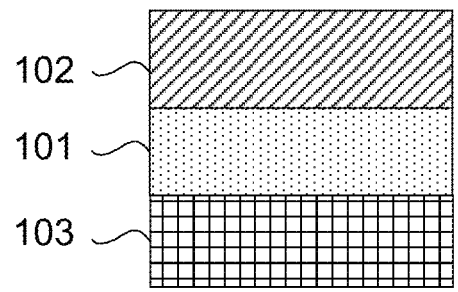
Figure 5K:
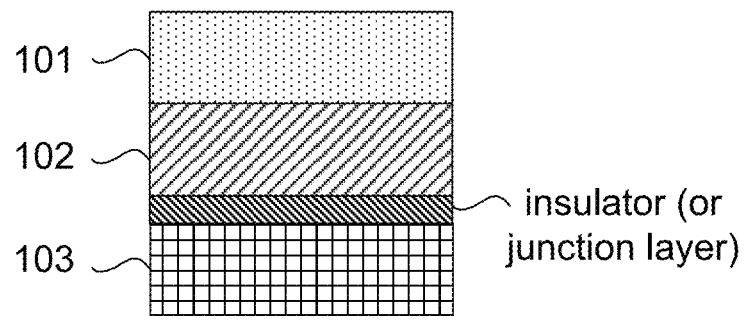

In the embodiment of the present application, it is possible to arrange the recording medium layers 101-103 in various ways. The recording medium layer 101 and the recording medium layer 102 are laminated in an orientation toward the recording surface side with respect to the recording medium layer 103. In the figures, the upper side is the recording surface side and the lower side is the substrate side. The recording medium layer 101 and the recording medium layer 102 may be laminated in either an order of recording medium layer 101/recording medium layer 102 (see FIG. 5H) or an order of recording medium layer 102/recording medium layer 101 from the recording surface side of the magnetic recording medium (see FIG. 5J). Also, when the recording medium layer 102 is provided on the side of the recording medium layer 103, an insulator may be provided between the recording medium layers 102 and 103 (see FIG. 5K). A junction layer may be arbitrarily provided between both of them.

The present magnetic recording medium may be configured by combining the above-described recording medium layers 101 through 103 with another configuration member(s).

(Substrate 40)

As the substrate 40 of the magnetic recording medium, a metal substrate made of a metal material such as aluminum, an aluminum alloy, etc. and also a nonmetal substrate made of a nonmetal material such as glass, ceramic, silicon, silicon carbide, carbon, etc. may be used. As a glass substrate, amorphous glass and crystallized glass can be used, and a conventional soda-lime glass and aluminosilicate glass can be used as the amorphous glass. Also as the crystallized glass, a lithium-system crystallized glass can be used. As a ceramic substrate, a sintered compact whose primary component is a conventional aluminum oxide, aluminum nitride, silicon nitride, etc., and fiber reinforced materials of these are usable. Also, a substrate with a NiP layer or a NiP alloy layer on the surface of the substrate, which are formed using a plating method or a sputtering method, can be used.

Herein, the substrate 40 preferably has an average surface roughness Ra of 2 nm (20 Å) or less, or further preferably 1 nm or less. The surface of the substrate preferably has a micro- waviness (Wa) of 0.3 nm or less (further preferably, 0.25 nm or less). Such value ranges are preferable from the perspective of making the magnetic recording head fly low. Note, the micro-waviness (Wa) of the surface is a value measured using a stylus type surface average roughness measuring instrument in a measurement range of 100 µm.

(Other Configurations of Magnetic Recording Medium)

In the present magnetic recording medium, a surface protective layer or a surface lubricant layer, which are used in a conventional magnetic recording medium, can be used. The surface protective layer is for preventing erosion of the recording medium layers 101, 102 and also for preventing defects of the medium surface when the ME recording head contacts the medium. A conventionally-known material can be used, and for example a material containing diamond like carbon (DLC), amorphous Si, $SiO_2$, and $ZrO_2$ can be arbitrarily used. From the perspective of high recording density, the thickness of the surface protective layer is preferably 1-10 nm because the distance between the magnetic recording head and the magnetic recording medium can be made small. The surface lubricant layer can be formed by applying lubricant such as perfluoropolyether, fluorinated alcohol, fluorinated carboxylic acid, etc. The surface protective layer and the surface lubricant layer may be made of a material with anisotropy in electrical conductivity. Also, the surface protective layer and the surface lubricant layer may be formed from a material with a large permittivity.

(ME Recording Head)

The ME recording head can limit a region in the magnetic recording medium where reversal of a magnetization due to the ME effect occurs to a minute region that is a nanometer-scale region. The ME recording head may be manufactured by applying a conventional technology as long as, in order to make a region where an electric field and a magnetic field are superimposed on each other minute, it has at least one of structures: i) a structure that allows an electric field to be locally focused and applied; ii) a structure that allows a magnetic field to be locally focused and applied; iii) a structure that allows both the electric field and magnetic field to be locally focused and applied; and iv) a structure that allows the electric field and magnetic field to partially overlap each other to form a minute superimposition region. The above-describe four types of superimposition regions are illustrated in FIGS. 6A-6D. FIG. 6A illustrates a superimposition region formed by applying an electric field E focused to a minimum region in a widely applied magnetic field H. In this case, the superimposition region corresponds to the electric field E. FIG. 6B illustrates a superimposition region formed by applying a magnetic field H focused to a minimum region in a widely applied electric field E. In this case, the superimposition region corresponds to the magnetic field H. FIG. 6C illustrates one in which a focused magnetic field and a focused electric field overlap each other. In this case, the superimposition region corresponds to the region of the magnetic field H and the electric field E. FIG. 6D illustrates a minute superimposition region formed by making widely applied magnetic field H and electric field E partially overlap each other.

Figure 7A:
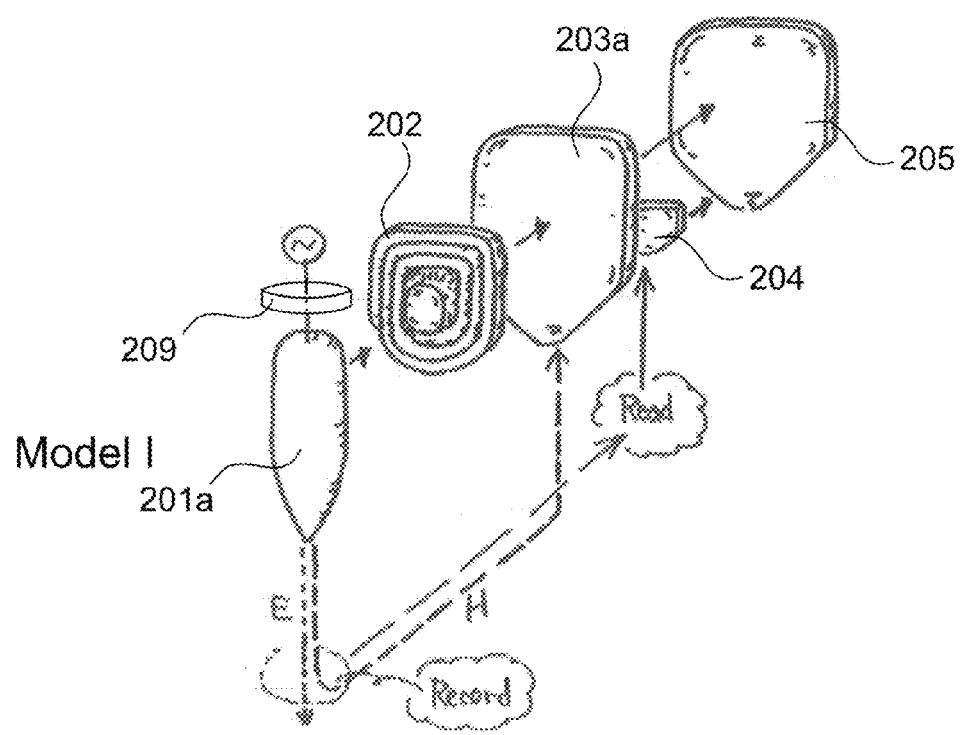

Typical basic configurations of the ME recording head are illustrated by Model I and II in FIGS. 7A and 7B.

(Model I)

The Model I is realized by adding a structure that allows an electric field and a bias magnetic field to be applied to a minute region to the conventionally-used perpendicular magnetic recording head. The magnetic recording head according to the Model I has at least a E-H pole 201a (or yoke), an inductor 202, a return path layer 203a, a read element 204, and a shield layer 205. For the inductor 202, the return path layer 203a, the read element 204, and the shield layer 205, a configuration of the conventional perpendicular magnetic recording head may be used without changing anything. An arrow E in the figure shows an electric field emitting from the E-H pole 201a. An arrow H shows a state where magnetic flux due to a magnetic field formed by the E-H pole 201a and the return path layer 203a emits from the E-H pole 201a, passes through the recording medium, and then returns to the return path layer 203a. The inductor 202 is formed in a coil shape, and the magnetic field to emit from the E-H pole 201a is formed by making a current flow in this coil. Also, the direction of an emitting magnetic field, which is plus or minus, is defined by the direction of the current.

It is necessary for the E-H pole 201a to (a) be made of a material that functions as a magnetic core, (b) have a structure of being connected with a terminal for applying electric field, and also in the present embodiment the E-H pole 201a further has (c) a structure that focuses an electric field and a magnetic field to a minute region. This is the model illustrated in FIG. 6C. Out of these, (a) can be realized by diverting a material of the conventional recording head. The material is preferably a magnetic material with extremely high Bs and high μ, and also the material needs to have electrical conductivity for simultaneously applying electric field. For example, a film made of NiFe, CoFeNi, CoFe, FeN, or FeZrN, etc. is preferably used. These materials are formed using a sputtering method, a pattern plating method including a frame plating method, etc., and can be arbitrarily processed. Also, (b) is realized by adding a proper wiring structure to the magnetic recording head.

The above-described (c) can be realized by processing the shape of the recording head to have a shape that is sharp toward the direction of the magnetic recording medium. As a result, the function of spatially limiting and applying the magnetic field and electric field is realized. In such case, a tip end of the E-H pole 201a is realized by a method of processing the tip to have a curvature corresponding to the size of a desired electric field-magnetic field superimposition surface. For example, the E-H pole 201a may be processed by a technology of photolithography. In the process of the E-H pole 201a, a sharp nano-stylus may be obtained by applying a nano fabrication technique which is often utilized for a nano-probe fabrication of a scanning probe microscopy (SPM) such as a focused ion beam (FIB) technology. Even in the probe process technology, it is effective to apply a method of attaching a carbon nanotube to the tip end. It is because applying an electric field is efficiently performed due to the high conductivity of the carbon nanotube. Also, when the carbon nanotube is used, it is possible to make the diameter of the tip end of the E-H pole 201a more minute so as to be about 10 nm. In such case, the carbon nanotube may be coated with a thin film by a technology such as a sputtering method. The pole thin film lac may be coated by about 1-50 nm. The pole thin film lac is made of a material (such as NiFe, CoFeNi, CoFe, FeN, FeZrN, etc.) that has the same characteristic as that of the E-H pole 201a. According to the configuration, the applied magnetic field to the magnetic recording medium tends to focus easily.

Also, in an attachment portion (supporting portion) of the E-H pole 201a, a mechanism that performs a minute gap adjustment by electric signals using a piezoelectric material 209 may be provided. An electric field applied from the tip end of the E-H pole 201a tends to slightly diffuse (enlarge). Therefore, a region of an applied electric field necessary for the magnetic recording tends to depend on the distance between the E-H pole 201a and the magnetic recording medium. Therefore, when the gap adjustment mechanism using the piezoelectric material is provided, there is a tendency that an excellent state of the gap can be maintained.

(Model II)

The ME recording head is realized as a further simplified structure in a Model II illustrated in FIG. 7B. In the Model II, a E-H pole 201b is configured of a conductive permanent magnet, and thereby a magnetic circuit is configured by a combination with a return path layer 203b. Also in the Model II, it is necessary to satisfy the requirements of the above-described (b). Especially as the requirement corresponding to the above-described (a) and (b), for example, a metal magnet thin film is preferably used as the permanent magnet.

In the Model II, in the case when the read element has a pinned layer, a magnetization direction (s) of the pinned layer and the direction of a magnetic field of the E-H pole 201b preferably correspond to each other. That has not only efficiency as a production means but also a tendency that occurrence of a noise magnetic field is suppressed.

(Common Configuration)

The type of the read element 204 is not limited in both Model I and Model II. Elements can be used in which a magnetic sensitive film that shows magnetoresistive effect such as, for example, an anisotropy magnetoresistive effect (AMR) element, a gigantic magnetoresistive effect (GMR) element, a tunnel magnetoresistive effect (TMR) element, etc. is used. The GMR element may be either a current in plane (CIP) type in which a current for magnetic signal detection flows a direction almost parallel with a surface of each layer configuring the GMR element, or a current perpendicular to plane (CPP) type in which a current for magnetic signal detection flows in a direction almost perpendicular to the surface of each layer configuring the GMR element.

The return path layers (203a and 203b) and the shield layer 205 prevent the read element 204 from receiving the effect of an external magnetic field. The return path layers (203a and 203b) have the function of collecting a magnetic flux from the magnetic recording medium during writing. These return path layers (203a and 203b) and the shield layer 205 are preferably formed from a high saturation magnetic flux density (Bs) material with a high magnetic flux density. For example, NiFe, CoFeNi, CoFe, FeN, or FeZrN, etc. can be used. A thin film made of these materials with a thickness of about 0.1-3 μm by a pattern plating method including a frame plating method, etc. can be used. Note, because the shield layer 205 is common in Model I and Model 11, it is omitted from FIG. 7B.

(Tip Shape)

Figure 8A:
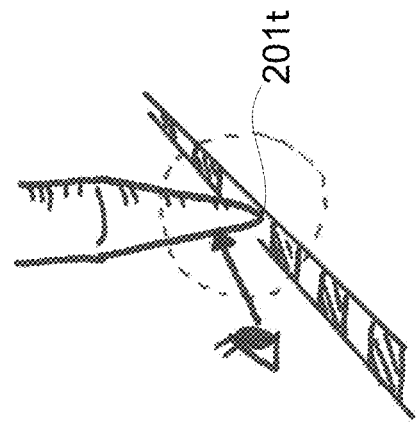
FIGS. 8A to 8C show embodiments of a tip end part of a recording pole.
Figure 8C:
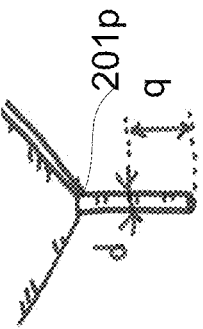
Figure 8B:
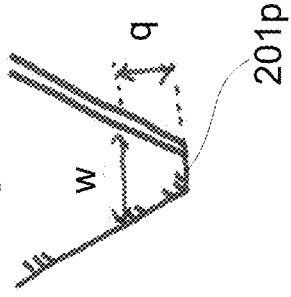

A shape of a tip part 201t of the E-H pole 201 is further explained. FIGS. 8A-8C are enlarged views of the tip end part 201t.

FIG. 8A is a schematic view of the tip end part 201t of the E-H pole 201 and the recording medium 1 to which magnetic data is recorded. In this example, the tip end part 201t is in a home plate shape, and its one angle is arranged toward the recording medium 1.

Further, the detail of the tip end part 201t is illustrated in FIG. 8B and FIG. 8C. In FIG. 8B, the tip end part 201t is in a square pyramid shape, and the minute tip end part is formed by disposing an arbitrary taper in the tip end part. Note, FIG. 8B shows a form that its tip end is chamfered. As a size thereof, when a length q from the bottom part 201p to going upward is 1 nm, a width w at a position 1 nm from the bottom part 201p should be in the range of 0.4-80 nm. Herein, the direction of the width w corresponds to the direction of the track width of the recording medium 1. FIG. 8C shows a form that a carbon nanotube (CNT) is attached to the bottom end 201p of the tip end part 201t. A size of the CNT is preferably narrow. In the region 1 nm from the tip end, a diameter d thereof should be in the range of 0.4-80 nm. It is also possible to realize such minute tip end part by attaching a narrow pillar through which a current flows. As a result of such shapes, it is possible to suppress spread of applied electric field or/and magnetic field and focus the electric field and magnetic field to a narrow region.

(Other Tip End Shape)

Figure 9C:
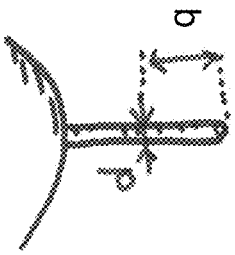
FIGS. 9A to 9C show embodiments of the tip end part of the recording pole.
Figure 9B:
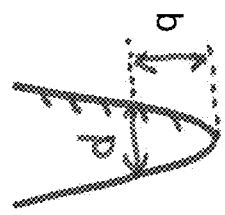
Figure 9A:
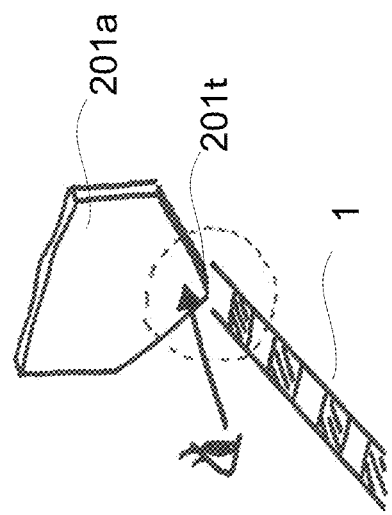

As another tip end shape, a cone shape is also applicable as illustrated in FIG. 9A. In such case, as illustrated in FIG. 9B, a diameter d at a length q 1 nm from the tip end part 201t should be a range of 0.4-80 nm. As illustrated in FIG. 9C, a form that a CNT is attached to a tip end in a cone shape is also applicable. Furthermore, a shape of a triangular pyramid whose tip end is not chamfered as illustrated in FIG. 10A and a shape of a square pyramid whose tip end is chamfered as illustrated in FIG. 10B are also applicable.

(Other Examples of the Present Application)

As mentioned above, a form known as a hard disk drive can be used as a form of the magnetic recording system to which the present application is applicable. Also, it should be understood that the present application is applicable to another type of data recording device that is a device such as for example a probe memory device.

Note, in the magnetic recording system of the present application, it is possible to perform delete/overwrite of signals in the same method as that of a conventional magnetic recording system (so-called hard disk drive device). However, crosstalk of remaining signals can be prevented by temporarily deleting signals of the entire recording medium.

Hereinafter, one of the present application is explained as a concrete example. Note, the present application is not limited forms that are described below. Within the same and equivalent scope of the present application, various changes may be made to following embodiments.

Example 1

In Example 1, an example of a composite medium is shown. The composite medium includes $\alpha$-$Cr_2O_3$ as one of antiferromagnetic thin films that show the ME effect and a metal ferromagnetic thin film with perpendicular magnetic anisotropy as one of ferromagnetic thin films. FIG. 11 is a schematic view of a portion of a data recording system in Example 1. This system includes the ME recording head 10 and the ME recording medium 1. The ME recording head 10 includes the magnetic field applying part 2 and the electric field applying part 3. The ME recording medium 1 includes the first recording medium layer 101 including an antiferromagnetic material having the ME effect, the second recording medium layer 102 including a ferromagnetic material adjacent to the first recording medium layer, the substrate 40, the third recording medium layer 103 provided on the substrate 40 side with respect to the first and second recording medium layers, and the lower electrode layer 31. Also, another layer may be included in the magnetic recording medium. When a desired growth texture cannot be obtained in another method, a thin seed layer may be included in the recording medium to form the preferred desired growth texture.

A power source 50 is electrically connected between the lower electrode 31 and the electric field applying part 12. By applying voltage between the electric field applying part 12 and the lower electrode 31 by the power source 50, an electric field can be applied to the recording medium layer 101. Also, a magnetic field can be applied in perpendicular to the film surface from the magnetic field applying part 11 to the recording medium layer 101 in a manner of overlapping the electric field. The electric field and magnetic field can be applied to the recording medium layer 101 in the relationship of almost parallel or almost antiparallel when the direction of the electric field or the direction of the magnetic field is switched. In the present application, it is possible to form a superimposition region where an electric field and a magnetic field overlap each other in a selectively/spatially localized region on the recording medium when a combination of the magnetic field applying part 2 and the electric field applying part 3 with the sharp electrode tip end is used.

In the case of switching an applied direction of the magnetic field by 180°, a direction of a flowing current in a coil is switched between plus (+) and minus (−) directions. The coil is one element of the magnetic field applying part. For switching an electric field direction by 180°, it is also possible by switching a polarity of the applied electric field.

Figure 12:
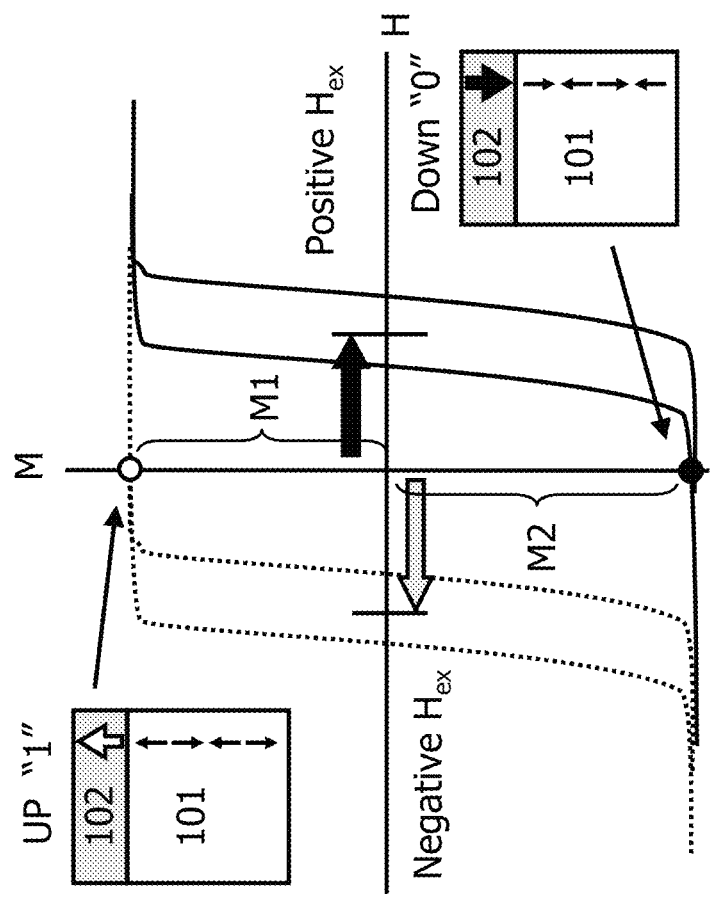
FIG. 12 is a schematic view showing magnetic data recording according to the first example.

FIG. 12 schematically shows magnetic data recording using magnetization switching phenomena by the ME effect according to Example 1. In FIG. 12, the vertical axis shows the amount of magnetization and the horizontal axis shows the strength of magnetic field. Two multilayers each having two layers illustrated in the upper left and lower right of the figure show a state where the recording medium layers 101 and 102 are laminated. The narrow arrows in the recording medium layer 101 show the orientations of spins of electrons, and the thick arrow in the recording medium layer 102 shows the direction of magnetization of the ferromagnetic layer.

The recording medium layer 102 formed of the ferromagnetic metal layer adjacent to $\alpha$-$Cr_2O_3$ receives unidirectional anisotropy or exchange bias from the antiferromagnetic material via exchange-coupling. The exchange bias reflects two relevant antiferromagnetic states that the $\alpha$-$Cr_2O_3$ can have, and can have a positive or negative value.

When an electric field and a magnetic field are simultaneously applied from external to the $\alpha$-$Cr_2O_3$a having the ME effect, the two equivalent states receive effect due to the ME effect, and one of the antiferromagnetic states becomes more stable in energy than the other one of the antiferromagnetic states depending on whether the relationship between the applied electric field and magnetic field is almost parallel or almost antiparallel. By the usage of the above-described thing, a domain state of the antiferromagnetic material can be actively controlled, and a magnetization state with the adjacent recording medium layer 102 can be operated via the exchange bias.

The recording medium layer 102 illustrated in the upper left illustrates the receiving of upward (thus, a shift of MH-loop is negative) exchange bias, and thus the magnetization is M1 when the value of the magnetic field is zero. In contrast, when the recording medium layer 102 illustrated in the lower right receives downward (i.e. a positive shift in MH-loop) exchange bias, the magnetization is M2 when the value of the magnetic field is zero.

Figure 13B:
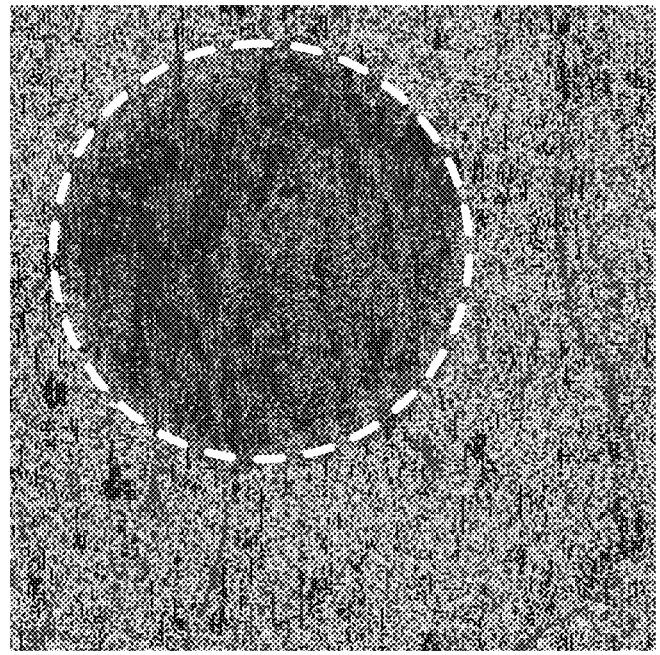
FIGS. 13B and 13C are magnetic images of the simulated recording medium according to the first example by a magnetic force microscopy (MFM).
Figure 13C:
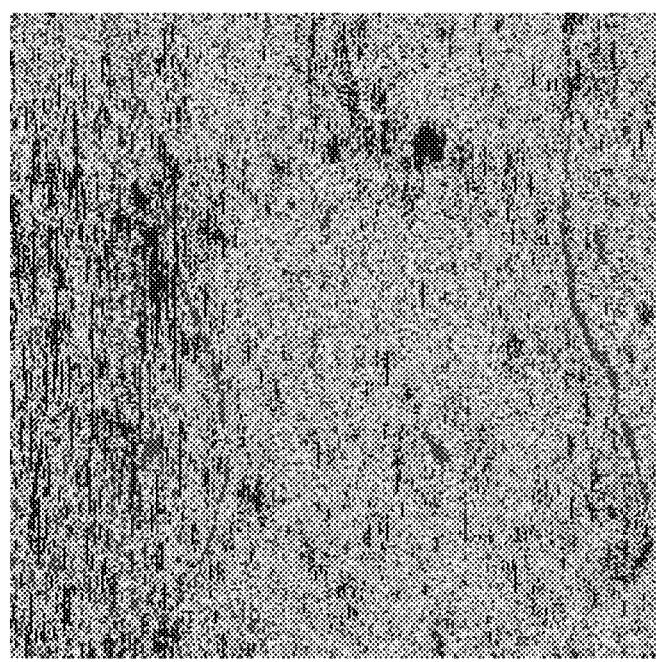

FIG. 13A is a topographic image in an atomic force microscope (AFM) of a simulated recording medium formed on a substrate. FIGS. 13B and 13C are magnetic images in a magnetic force microscope (MFM). In the simulated recording medium, the substrate 40 is a sapphire substrate; the lower electrode 31 is a Pt layer; the recording medium layer 101 is an antiferromagnetic oxide layer having the ME effect made from $\alpha$-$Cr_2O_3$; and the recording medium layer 102 is a ferromagnetic metal layer made of a CoPt alloy. In an actual magnetic recording medium, a protective layer may be provided on the ME recording medium 1, but description thereof is omitted because this is a known technology. The lower electrode 31, the recording medium layer 101, the recording medium layer 102, and the like may be formed by using an arbitrary physical or chemical deposition process such as a sputtering method, a pulsed laser deposition method, an ion-beam deposition method (IBD), and a chemical vapor deposition method.

(Manufacture of Magnetic Recording Medium)

Manufacture of the simulated recording medium used in Example 1 is described below in detail.

On the surface of a c plane sapphire substrate with step/terrace structure, a Pt (111) lower electrode layer 31 with a thickness of 25 nm is formed by a radio frequency (RF) sputtering method.

On the surface of the Pt (111) layer, an amorphous $Cr_2O_3$ precursor layer is formed by an ion-beam deposition method under an argon-oxygen atmosphere at room temperature.

First, heating is performed for three hours at 500° C. in a vacuum. Next, heating is performed for three hours at 700° C. in an oxygen atmosphere. Then, a recording medium layer 101 made of an $\alpha$-$Cr_2O_3$ (101) thin film with a thickness of 50 nm is formed.

A recording medium layer 102 made of a CoPt alloy (75% Co content) ferromagnetic layer with a thickness of 3 nm is formed by an ion-beam deposition (IBD) method under an argon atmosphere at room temperature.

(Description of Image Figures)

FIG. 13A is a topographic image of the surface of a simulated recording medium. FIGS. 13B and 13C show magnetic force images before and after simultaneously applying an electric field and a magnetic field at the same position. Furthermore, a dashed line in the figure illustrates a region where the electric field and the magnetic field are simultaneously applied. According to FIG. 13C, it can be recognized that the directions of magnetizations of the CoPt alloy in the region where the electric field and the magnetic firled are simultaneously applied are arranged in one direction. From the above-described thing, it is recognized that magnetic data can be written only to a preferred portion of the recording medium layer 101 due to ME recording principle. Also, it is recognized that it is possible to read data via the recording medium layer 102 made of the ferromagnetic material magnetically connected to the recording medium layer 101 to which data is written. At this time, it is possible to arrange the magnetization direction of the ferromagnetic layer in the preferred direction by selecting the direction of the superimposition of the electric field•magnetic field.

Listed as characteristics that are preferable to the recording medium 101 of the present application are a large coupling coefficient of electric and magnetic properties, and occurrence of sufficiently large exchange bias in a wide temperature range. The characteristics can be obtained by usage of a single material having the ME effect excellent in the characteristics and can be obtained by usage of a composite material that an antiferromagnetic material having the ME effect and another antiferromagnetic material with even higher Néel temperature are combined. In the composite material, a structure of the material, a thickness of the layer, a magnetic property (anisotropy energy and Néel temperature of the antiferromagnetic material), and the like are adjustable so as to maximize the exchange bias in a predetermined temperature range.

Example 2

Figure 14A:
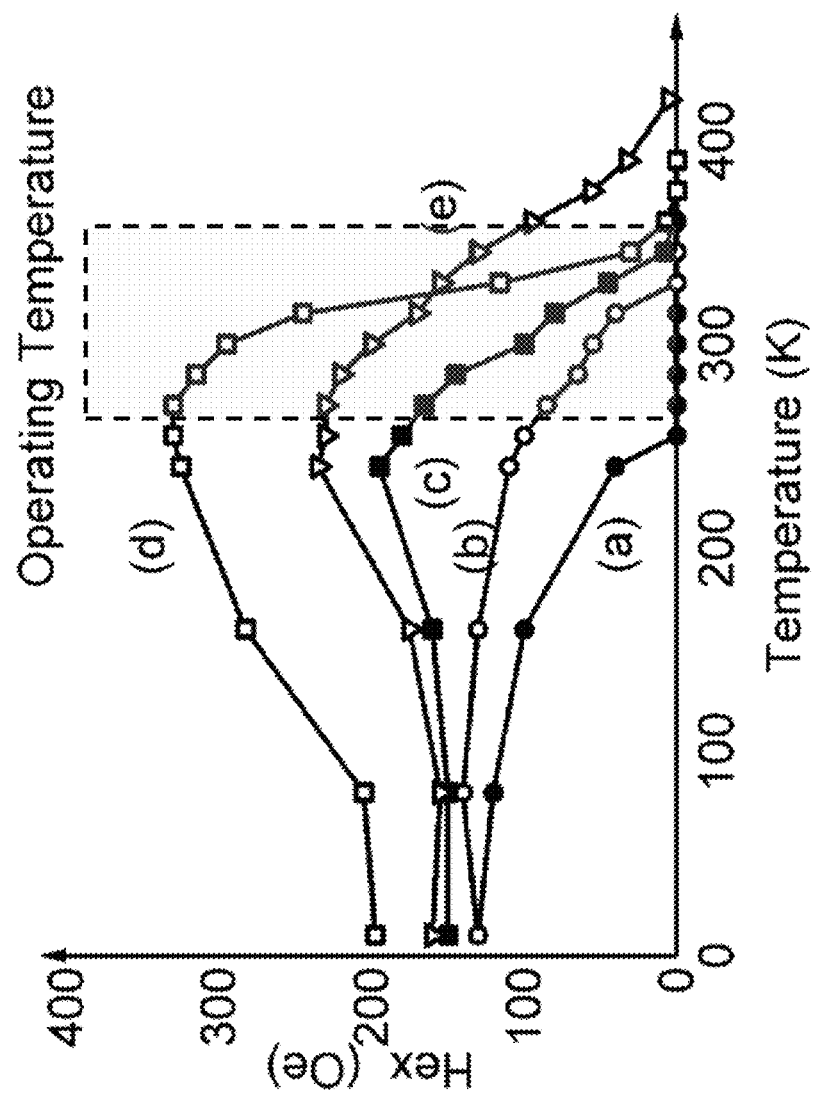
FIGS. 14A and 14B show the evaluation results of temperature dependency of exchange bias according to a second example.

In Example 2, an example of which the strength of exchange-coupling and the temperature property in an operating temperature range (300+50K) have been improved by manufacturing a composite material in which an antiferromagnetic $\alpha$-$Cr_2O_3$ layer having the ME effect and a normal antiferromagnetic $\alpha$-$Fe_2O_3$ layer are laminated. The example is illustrated in FIG. 14A. Herein, $\alpha$-$Fe_2O_3$ has a corundum structure that is the same as that of $\alpha$-$Cr_2O_3$, and is a material that doesn't have the ME effect as with even higher Néel temperature. A combined one of both of them with the most desired material property-structure as this example can be preferably used for the recording medium layer 101.

Figure 14B:
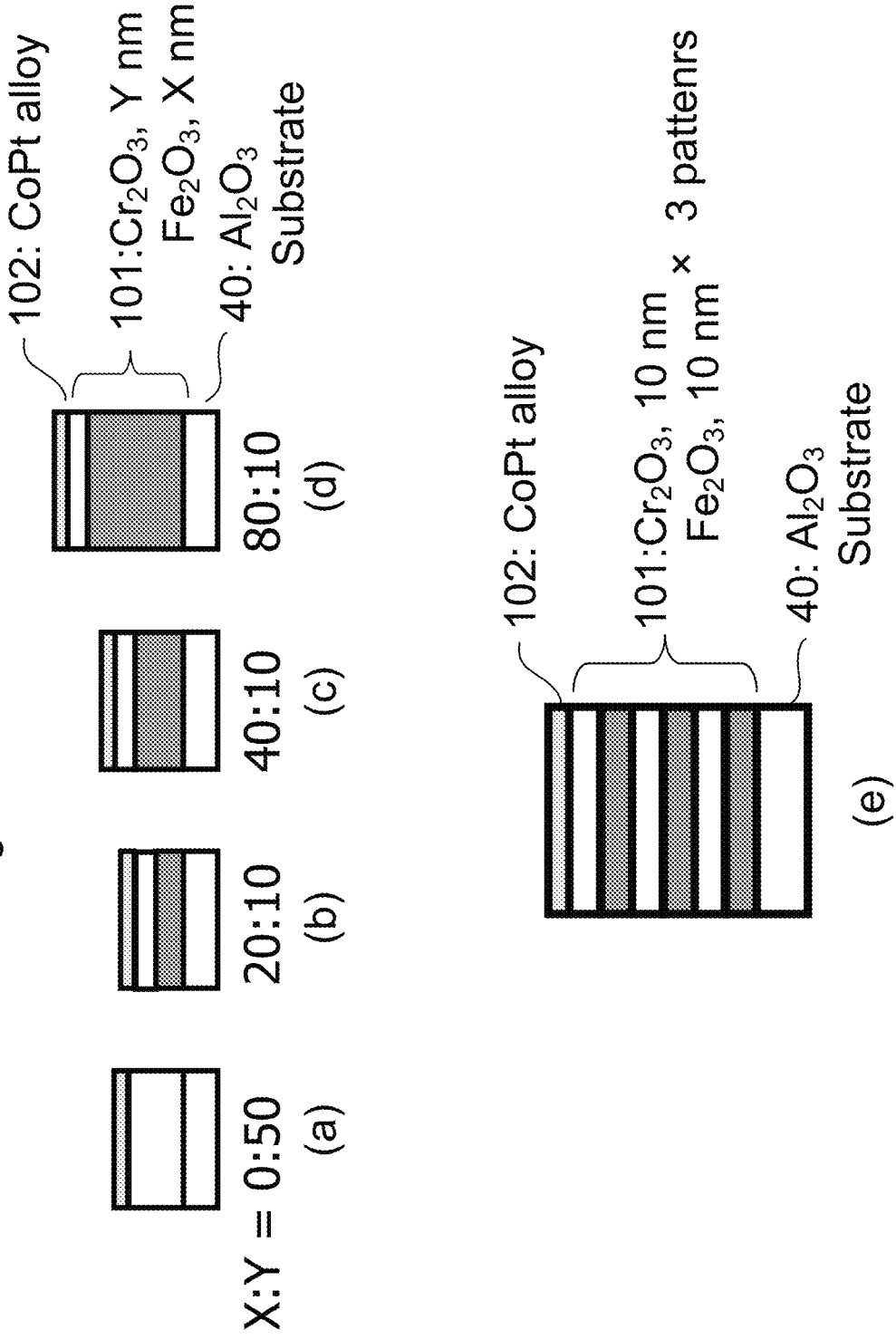

FIG. 14A is data that shows the temperature dependency of exchange bias when the lamination structure in which α-Cr$_2$O$_3$ and α-Fe$_2$O$_3$ are combined is used for the recording medium layer 101. The vertical axis is the measured exchange bias (Oe), the horizontal axis is the temperature (K), and the region surrounded by the broken line is a supposed operating temperature range. A manufacture method of Example 2 is described below in detail. In the figure, (b), (c), (d), and (e) are samples of which lamination thickness and lamination pattern of the recording medium layer 101 have been changed. Thicknesses of them are illustrated in FIG. 14B.

The substrate 40 is a c plane sapphire substrate, and the recording medium layer 102 is a ferromagnetic metal layer made of a CoPt alloy.

On the surface of the c plane sapphire substrate with step/terrace structure, an α-Fe$_2$O$_3$ (001) layer is formed by an RF sputtering method under an argon•oxygen atmosphere (Ar:O$_2$ flow ratio=15:15) at 0.3 Pa at 700° C. The thickness (X) of the layer is changed to be 0, 20, 40 and 80 nm.

On the surface of the α-Fe$_2$O$_3$ (001) layer, an α-Cr$_2$O$_3$ (001) layer with a thickness of 10-50 nm is formed by an RF sputtering method under an argon•oxygen atmosphere (Ar:O$_2$ flow ratio=28:2) at 0.3 Pa at 500° C. The recording medium layer 101 is formed of the α-Fe$_2$O$_3$ and the α-Cr$_2$O$_3$.

The recording medium layer 102 formed of a CoPt alloy (75% Co content) ferromagnetic layer with a thickness of 3 nm is formed by an ion-beam deposition (IBD) method under an argon atmosphere at room temperature.

FIG. 14A also shows the result (a) of a case where only the α-Cr$_2$O$_3$ is formed on the c plane sapphire substrate under the same condition. When the film thickness of the underlaying α-Fe$_2$O$_3$ layer and the lamination pattern are changed, the value of exchange coupling between the α-Cr$_2$O$_3$ and the CoPt ferromagnetic layer changes. It is recognized that the magnitude of exchange bias and the thermal behavior in the operating temperature range can be adjusted to be preferred. The configuration of the recording medium described above is illustrated in FIG. 14B.

Other Embodiments

The present application is executable in various forms by arbitrarily controlling an electric field and magnetic field. As described above, there are four types of the control of the magnetic field and electric field, which are illustrated in FIGS. 6A through 6D. Hereinafter, these embodiments are introduced.

(Wide Electric Field, Narrow Magnetic Field)

FIGS. 15A through 15F illustrate six models that form a superimposition region by superimposing a narrow magnetic field in a wide electric field.

(Constant Electric Field, Controlled Magnetic Field, Convertible Pole)

Figure 15A:
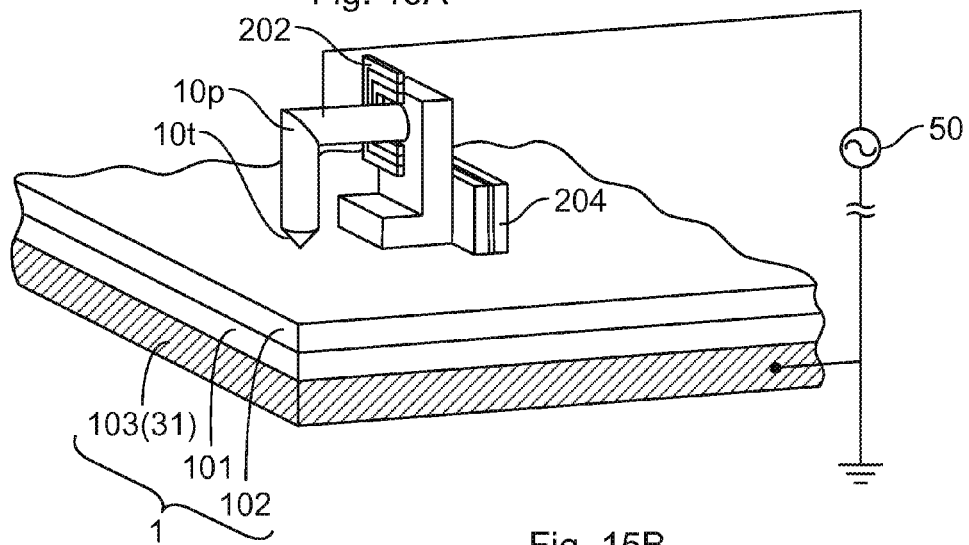
FIGS. 15A to 15F show embodiments for applying a narrow magnetic field to a wide electric field.

FIG. 15A discloses a recording pole 10p and the recording medium 1. The recording pole 10p is formed of an electromagnet, and functions as the magnetic field applying device and also works as the upper electrode. The lower electrode 31 is formed in the lower side of the recording medium 1. The upper electrode and the lower electrode 31 are electrically connected, and thereby the function as the electric field applying device is obtained. A tip end 10t of the recording pole 10p is formed such that its tip end is sharp to narrow a magnetic field. In the example, the direction of the applied electric field is constant (bias electric field). The magnetic data is recorded to the recording medium 1 (specifically, the first recording medium layer 101 in the recording medium 1) by arbitrarily switching the applied magnetic field direction by 180°. It is also possible to operate the recording by changing the direction of the applied electric field with the fixed magnetic field. Therefore, in the recording pole 10p, a control power source 50 that is capable of controlling an applied electric field directions (plus and minus) is provided. With the control power source 50, a switching function is realized. The switching function switches the electric field and/or magnetic field so as to alternately switch a state where the electric field and magnetic field that are applied to the recording medium are almost parallel and a state where the electric field and magnetic field are almost antiparallel. Note, as a part of the magnetic field applying device, an inductor 202 for forming a magnetic field is provided, and a reading element 204 for reading magnetic data of the recording medium 1 is further provided. From the upper side of the recording medium 1, the second recording medium layer 102, the first recording medium layer 101, and the third recording medium layer 103 are provided. The substrate under them is omitted from the drawing. The third recording medium layer 103 also functions as the lower electrode 31, and is electrically connected to the recording pole 10p working as the upper electrode.

(Ring Shaped Electrode)

Figure 15B:
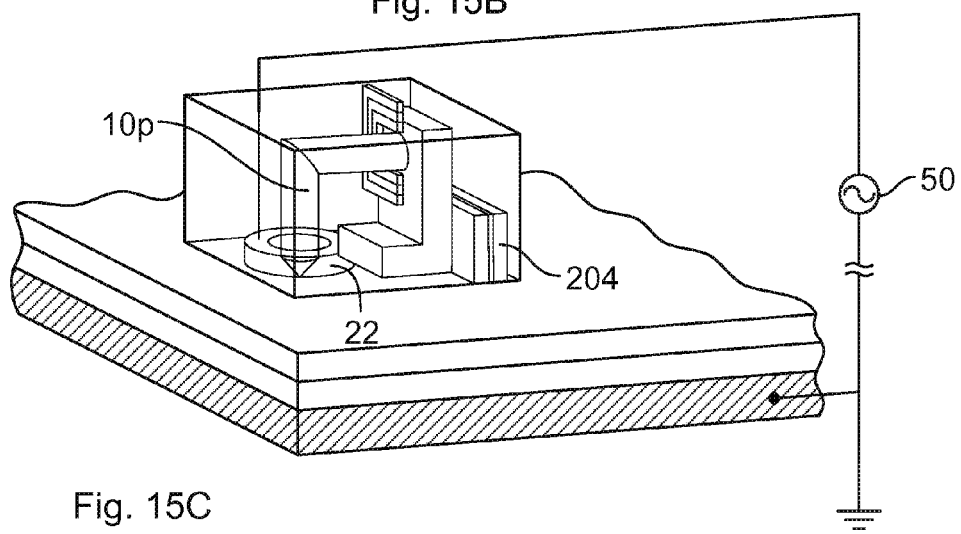

FIG. 15B discloses a model that controls the magnetic field but widely applies the electric field in the same manner as in FIG. 15A. The difference is that the structure of the electric field applying device is realized by a ring shaped electrode, not by the recording pole 10p. In the present embodiment, the recording pole 10p functions only as the magnetic field applying device, and a ring shaped electrode 22 functions as the electric field applying device. In the example, the electrode 22 is connected to the control power 50. The direction of the electric field is controlled by switching a polarity of the applied electric field while the direction of the magnetic field generated by the electromagnetic configuring the recording pole 10p is pinned in one direction. Note, the control can also be performed by applying the electric field in a constant direction and switching the direction of the magnetic field generated by the electromagnetic.

(Electrode Separation)

Figure 15C:
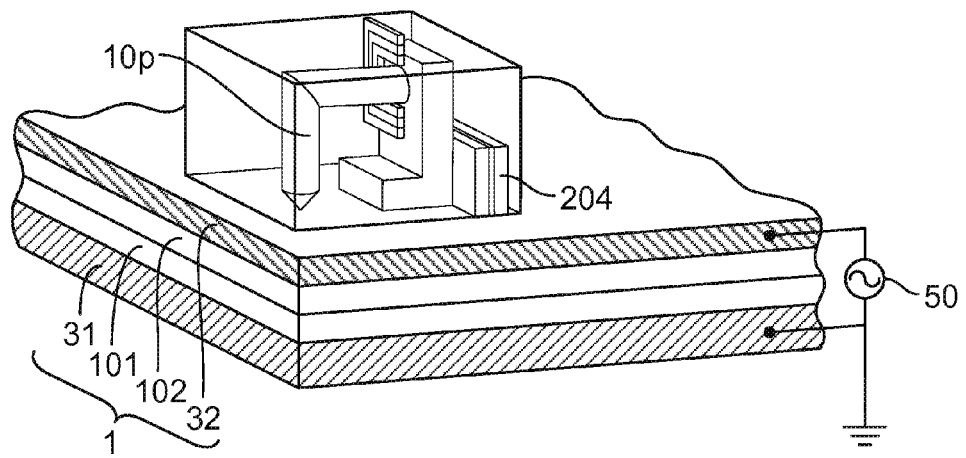

In FIG. 15C, the recording pole 10p is formed of the electromagnetic and functions as the magnetic field applying device. In contrast, the electric field applying device is separated from the recording pole 10p. Specifically, the upper electrode 32 is provided as the upper layer of the recording medium 1, and the lower electrode 31 is provided as the bottom layer thereof. The first and second recording medium layers 101 and 102 are arranged between the two layers. Furthermore, in the example, the direction of the applied electric field is controlled by connecting the two electrodes 31 and 32 to the control power 50. The recording pole 10p functions only as the magnetic field applying device and doesn't function as the electric field applying device. Note, the control can also be performed by switching the direction of the magnetic field generated by the electromagnetic while the orientation of the electric field is fixed.

Figure 15D:
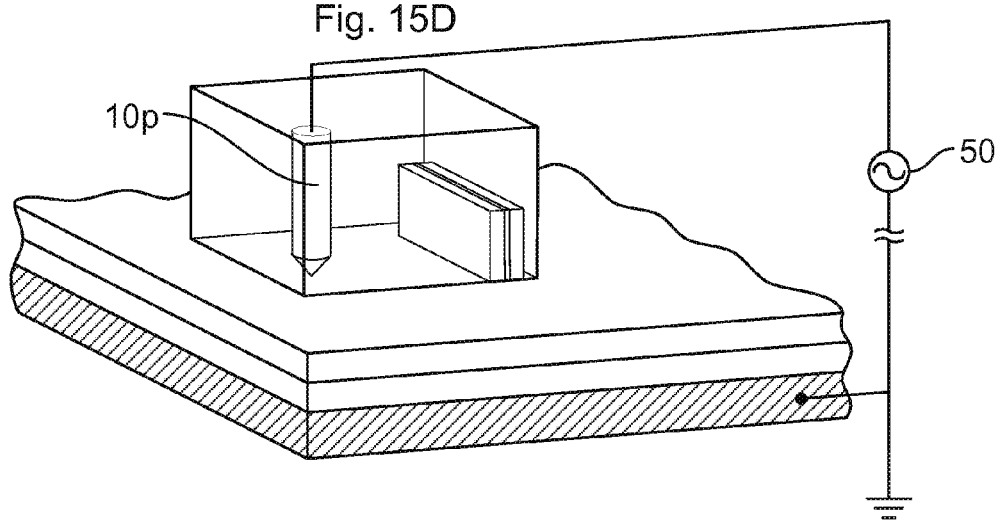
Figure 15E:
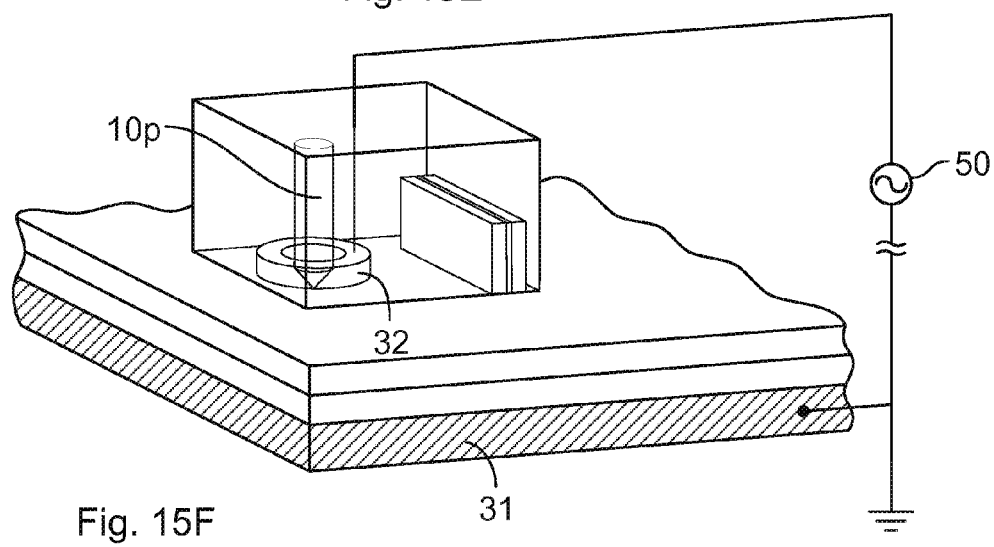
Figure 15F:
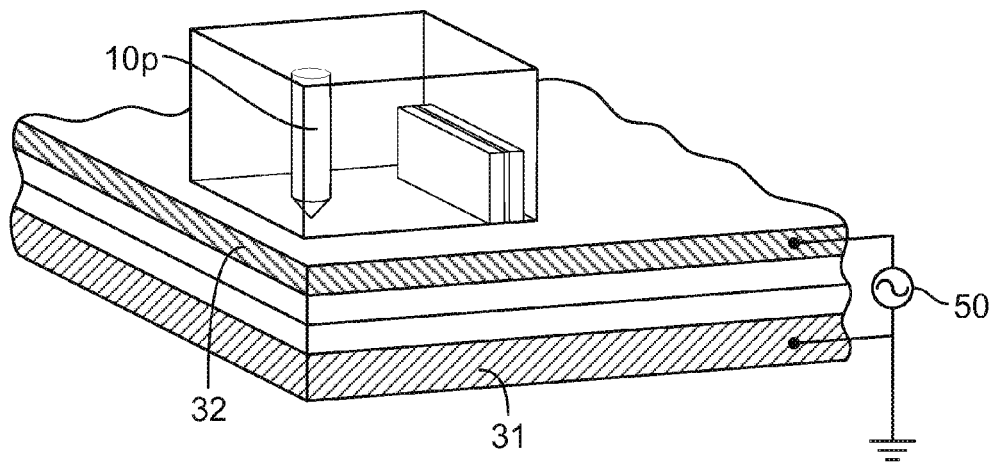

FIGS. 15D through 15F illustrate forms that a permanent magnet is used in the magnetic field applying device. When the permanent magnet is used, the magnetization direction is constant. Because of this, the recording information in the recording medium 1 is controlled by switching the direction of the applied electric field. Specifically, the electric field applying device is connected to the control power source 50.

(Permanent Magnet, Convertible Pole)

In FIG. 15D, the recording pole 10p is configured of the permanent magnet and also works as the upper electrode. As a result, one recording pole 10p serves as the magnetic applying device and the electric field applying device. Furthermore, by making its tip end sharp, it is possible to apply a narrowed magnetic field to the recording medium.

(Ring Shaped Electrode)

In FIG. 15E, the magnetic field applying device is formed of the permanent magnet. By making its tip end sharp, a narrowed magnetic field is applied. In contrast, the ring shaped upper electrode 32 works as the electric field applying device, and the upper electrode 32 is connected to the lower electrode 31 via the control power source 50.

(Electrode Separation 2)

FIG. 15F illustrates a form that the upper electrode is separated from the upper electrode as in FIG. 15C. In the present embodiment, the recording pole 10p is arranged that is formed of the permanent magnet and works as the magnetic field applying device. Then, the upper electrode 32 and the lower electrode 31 are arranged as the upper and bottom layers of the recording medium 1. When the two electrodes are connected to the control power 50, the electric field direction is arbitrarily switched.

(Narrow Electric Field, Wide Magnetic Field)

Figure 16A:
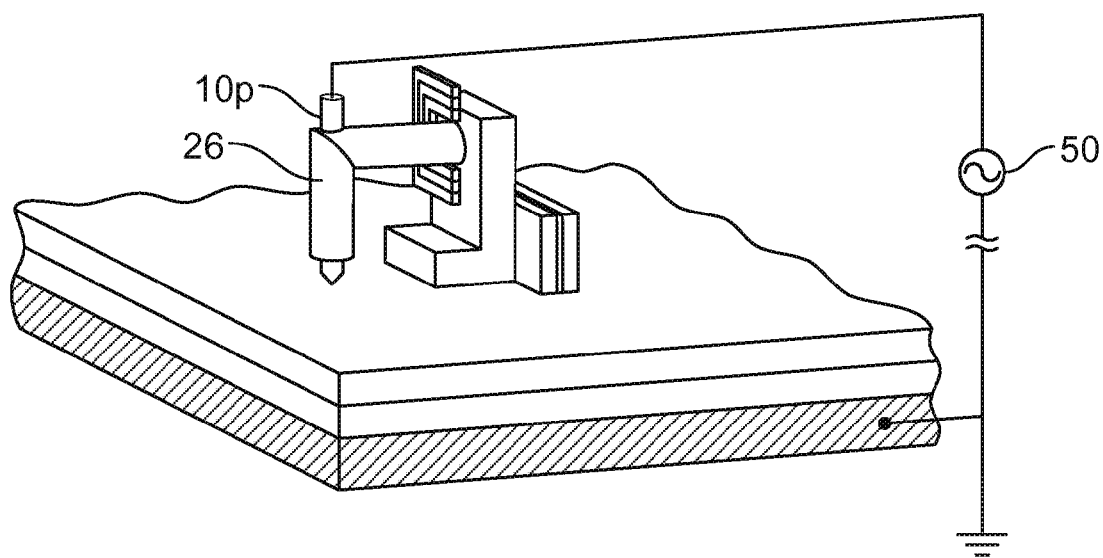
FIGS. 16A and 16B show embodiments for applying a wide magnetic field to a narrow electric field.
Figure 16B:
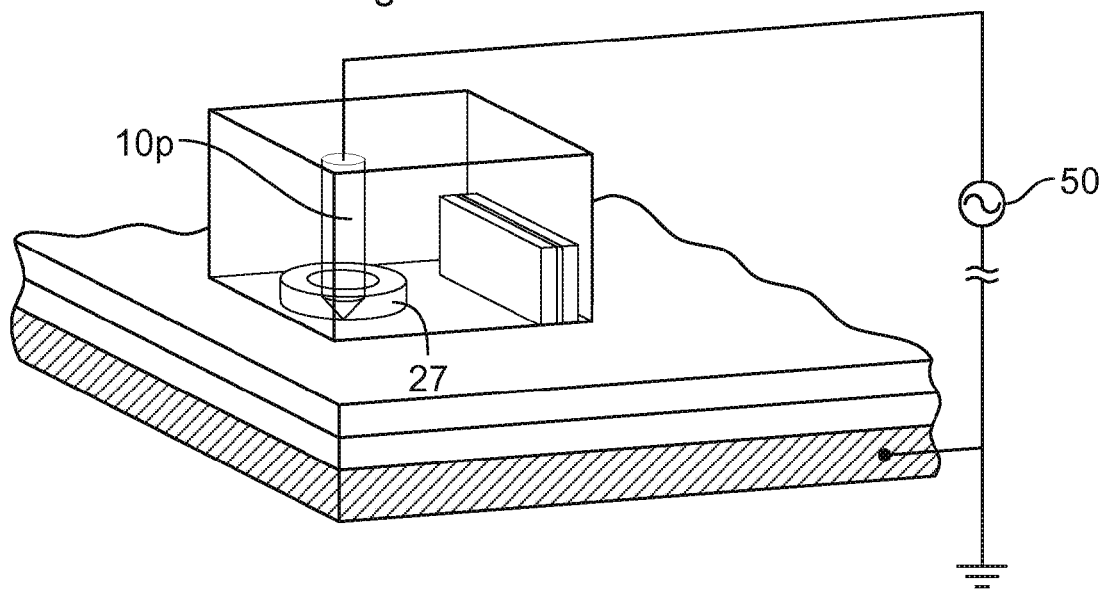

FIGS. 16A and 16B illustrate two models that form a superimposition region by superimposing a narrow electric field in a wide magnetic field. FIG. 16A shows an embodiment in which the recording pole 10p and an electromagnet 26 are provided. The recording pole 10p has a sharp tip end and works as the upper electrode. The electromagnet 26 covers the surrounding of the pole. In the present embodiment, the direction of the electric field is arbitrarily switched by connecting the recording pole 10p to the control power source 50. In this case, the magnetic field applying device applies a bias magnetic field whose direction is constant. Note, in the configuration illustrated in FIG. 16A, the control may also be performed by using a bias electric field whose direction is constant and arbitrarily switching the direction of the magnetic field from the magnetic field applying device.

In FIG. 16B, the magnetic field applying device is not arranged in the surrounding of the upper electrode. The magnetic field applying device is formed with a ring shaped permanent magnet 27 and is arranged in the periphery of the recording pole 10p. There is a predetermined gap between the ring shaped permanent magnet 27 and the periphery of the recording pole 10p. In this case, a configuration such as the inductor 202 for generating a magnetic field is unnecessary.

(Narrow Electric Field, Narrow Magnetic Field)

Figure 17A:
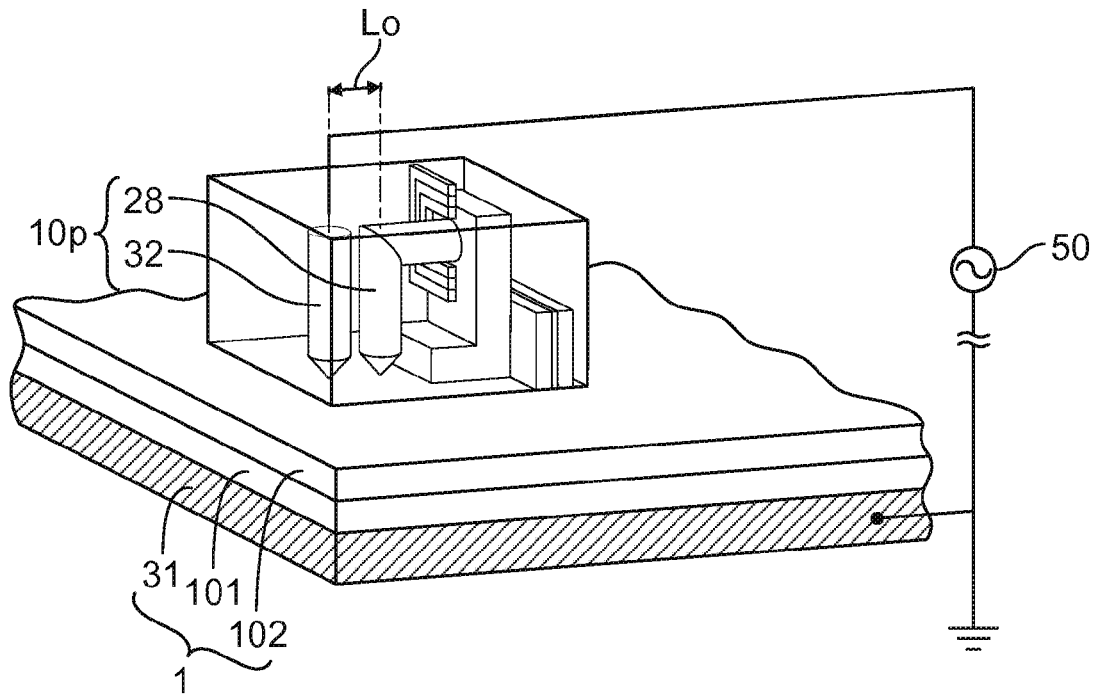
FIGS. 17A and 17B show embodiments for forming a superimposition region by making a wide electric field and magnetic field overlap each other.
Figure 17B:
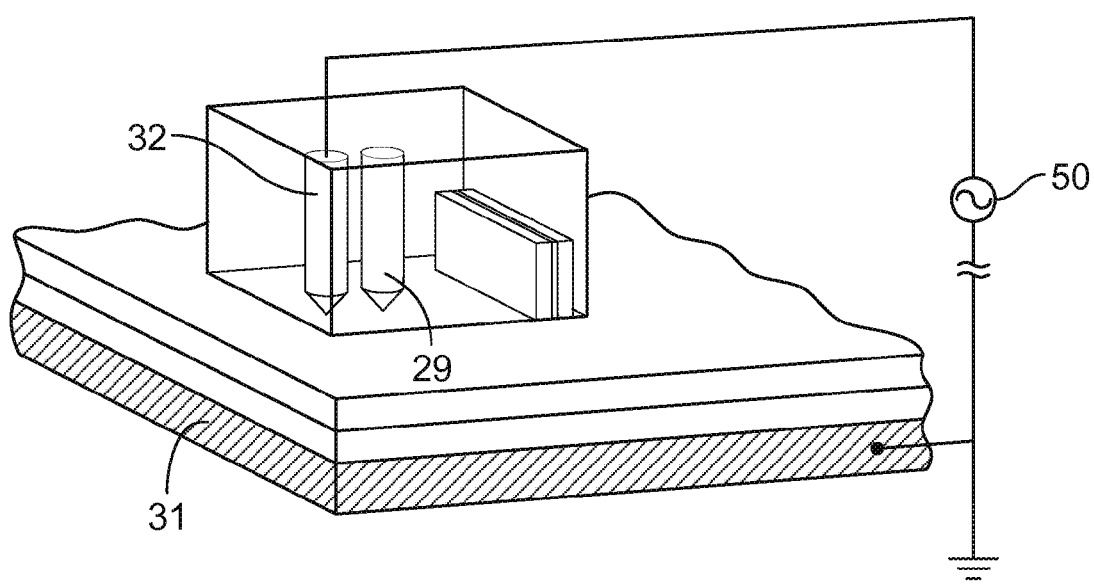

FIGS. 17A and 17B illustrate embodiments that both the electric field and the magnetic field are narrowed. In FIG. 17A, the recording pole 10p is configured from the upper electrode 32 and an electromagnet 28. The upper electrode 32 has a sharp tip end and works as the electric field applying device. The electromagnet 28 has a sharp tip end and works as the magnetic field applying device. A space Lo between two tips of the upper electrode and the electromagnet is arbitrarily set such that a minute superimposition region can be formed on the first recording medium layer of the recording medium. For the setting, the distance between the recording pole 10p and the recording medium 1 and the degree of diffusion of the magnetic field and electric field are considered. It is thought that, when the distance between the recording pole 10p and the recording medium 1 is about 1-50 nm, an executable range of the space Lo is 1-200 nm. Note, the sharp tip ends of the upper electrode 32 and the electromagnet 28 can be arranged such that extension lines thereof intersect each other at a predetermined angle (see FIG. 3), and it is possible to adjust the size and position of the superimposition region with the angle.

In FIG. 17B, the magnetic field applying device is formed with a permanent magnet 29 instead of the electromagnet 28 of FIG. 17A. In this case, a configuration such as the inductor 202 for generating a magnetic field is unnecessary. The upper electrode 32 is connected to the lower electrode 31 via the control power source 50, and the direction of the electric field is arbitrarily controlled corresponding to magnetic data to be recorded.

Other forms of the configuration for narrowing the electric field and magnetic field (configuration that realizes the function of spatially limiting and applying the magnetic field and electric field) are also applicable. One example is a form in which the tip end doesn't have a projection shape but has a concave shape. As another example, it is possible to use a magnetic field lens.

(Movement Mechanism)

FIG. 18 is a conceptual view of a movement mechanism 8 that has the function of moving at least one of the electric field applying device 3 and the magnetic field applying device 2 according to the embodiment of the present application to an arbitrary position on the recording medium 1. The movement mechanism 8 is formed with the ME recording head 10 (works also as a reading head), a suspension 81, an arm 82, and an actuator unit 83. The recording medium 1 is attached to a hub 84 (spindle) that is rotated by a motor.

The ME recording-reading head 10 is attached to a tip end of the arm 82 via the suspension. The arm 82 is driven by the actuator unit 83. In FIG. 18, one recording head 10 as the ME recording•reading reproducing means is illustrated, but two or more heads may be provided in one system. Also, a ME recording-reading reproducing means that can apply a plurality of magnetic fields is applicable, and a plurality of recording heads may be provided in one arm. The number of the recording medium 1 provided in one system is not limited.

As the above described movement mechanism, a movement mechanism of a conventional technology is usable. Regarding the movement mechanism and technologies related to it, following documents are incorporated herein by reference.

U.S. Pat. No. 7,190,559 (B2)
U.S. Pat. No. 7,123,451 (B2)
U.S. Pat. No. 5,768,065 (A)
U.S. Pat. No. 7,440,229 (B2)
U.S. Pat. No. 7,580,222 (B2)
U.S. Pat. No. 7,718,218 (B2)
U.S. Pat. No. 7,706,103 (B2)
US2006114606 (A1)
US2005141137 (A1)
U.S. Pat. No. 7,679,860 (B2)
U.S. Pat. No. 7,716,812 (B2)
U.S. Pat. No. 8,284,527 (B2)

While the present application has been explained based on the examples as described above, it is obvious for a person skilled in the art that variety of changes of the above-described examples may be made without departing from the spirit of scope of the following claims or its scope.

What is claimed is:

1. A magnetic recording system, comprising following configurations:
   a recording head;
   a recording medium that includes a first recording medium layer, a second recording medium layer, and a substrate, wherein
   the first recording medium layer includes an antiferromagnetic thin film formed of an antiferromagnetic material having a magneto electric (ME) effect,
   the second recording medium layer includes a ferromagnetic thin film for generating a large magnetization necessary for transferring and reading magnetic data recorded in the first recording medium layer, the substrate holds the first recording medium layer and the second recording medium layer that are laminated thereon;

an electric field applying device that applies an electric field to the recording medium;

a magnetic field applying device that applies a magnetic field; and a movement mechanism that has a function of moving at least one of the electric field applying device and the magnetic field applying device to an arbitrary position on the recording medium, wherein the magnetic recording system has a function of controlling an applying direction of at least one of the electric field applying device and the magnetic field applying device, and the recording head is arranged at a position facing the recording medium.

2. The magnetic recording system according to claim 1, wherein the antiferromagnetic thin film having the ME effect includes at least one of $\alpha$-$Cr_2O_3$, $YMnO_3$, and $BiFeO_3$.

3. The magnetic recording system according to claim 1, wherein the first recording medium layer further includes an antiferromagnetic material not having the ME effect, a Néel temperature of the antiferromagnetic material is higher than a Neel Néel temperature of the antiferromagnetic material having the ME effect, and the first recording medium layer has a structure in which the antiferromagnetic material having the ME effect and the antiferromagnetic material not having the ME effect are laminated or mixed.

4. The magnetic recording system according to claim 1, wherein the antiferromagnetic thin film having the ME effect is a ferrimagnetic thin film, and the ferrimagnetic thin film includes $Ga_{1-x}Al_xFeO_3$ ($0<x<1$).

5. The magnetic recording system according to claim 1, wherein the first recording medium layer further includes an antiferromagnetic material not having the ME effect, the antiferromagnetic material having the ME effect is a ferrimagnetic material, a Néel temperature of the antiferromagnetic material not having the ME effect is higher than a Curie temperature of the ferrimagnetic material having the ME effect, and the first recording medium layer has a structure in which the ferrimagnetic material having the ME effect and the antiferromagnetic material not having the ME effect are laminated or mixed.

6. The magnetic recording system according to claim 1, wherein the recording medium further includes a third recording medium layer, the third recording medium layer is on the substrate side with respect to the first and second recording medium layers, and the third recording medium layer has a function of forming a magnetic path of magnetic flux for writing.

7. The magnetic recording system according to claim 1, wherein the first recording medium layer further includes an antiferromagnetic material not having the ME effect, and the antiferromagnetic material includes one of an antiferromagnetic metal and an antiferromagnetic oxide that include at least one transition metal element.

8. The magnetic recording system according to claim 1, wherein the second recording medium layer further includes a ferromagnetic thin film, and the ferromagnetic thin film that includes one of a soft magnetic metal, a hard magnetic metal, and a ferromagnetic metal oxide that include at least one of Ni, Co, Fe, and Mn.

9. The magnetic recording system according to claim 1, wherein the recording medium further includes a third recording medium layer, the third recording medium layer that includes one of a soft magnetic metal and a soft magnetic metal oxide that include at least one of Ni, Co, Fe, and Mn.

10. The magnetic recording system according to claim 1, wherein the recording head includes one of or both the electric field applying device and the magnetic field applying device, the electric field applying device has a function of spatially limiting and applying an electric field, the magnetic field applying device has a function of spatially limiting and applying a magnetic field, the recording head has a switching function that switches the electric field and/or magnetic field so as to alternately switch between a parallel state where the electric field and the magnetic field are almost parallel and an antiparallel state where the electric field and the magnetic field are almost antiparallel, the electric field and the magnetic field being applied to the recording medium and data recording to the recording medium is performed by the switching function.

11. The magnetic recording system according to claim 1, wherein the recording head includes the magnetic field applying device, and the magnetic field applying device is a permanent magnet.

12. The magnetic recording system according to claim 1, wherein the recording head includes the magnetic field applying device, and the magnetic field applying device is formed with a coil for flowing a current and a yoke (magnetic core) for focusing magnetic flux.

13. The magnetic recording system according to claim 1, wherein the electric field applying device is formed with following configurations:

an electrode formed in the recording head;

a power source connected between the electrode and the recording medium; and a ground connected to the recording medium.

14. The magnetic recording system according to claim 1, wherein the recording medium further has a third recording medium layer, the electric field applying device is formed with following configurations:

an electrode connected to the second recording medium layer;

an electrode connected to the third recording medium layer;

a ground connected to one of the electrode connected to the second recording medium layer and the electrode connected to the third recording medium layer; and a power source connected between the electrode connected to the second recording medium layer and the electrode connected to the third recording medium layer.

15. The magnetic recording system according to claim 1, wherein the first recording medium layer is positioned on the substrate side with respect to the second recording medium layer.

16. The magnetic recording system according to claim 1, wherein the second recording medium layer is positioned on the substrate side with respect to the first recording medium layer.

17. A magnetic recording device formed with a recording medium, a magnetic field applying part, and an electric applying part, wherein
the recording medium has a first recording medium layer and a second recording medium layer,
the first recording medium layer including an antiferromagnetic film configured of an antiferromagnetic material having a magneto electric (ME) effect,
the second recording medium layer including a ferromagnetic layer configured of a ferromagnetic material and being arranged in a position at which the second recording medium layer exchange-couples to the antiferromagnetic film,
the magnetic field applying part applies a magnetic field to the recording medium, and
the electric field applying part has an upper electrode and a lower electrode, and applies an electric field to the recording medium that is arranged between the upper electrode and the lower electrode,
an applying direction of one of the magnetic field applying part and the electric field applying part is pinned and an applying direction of the other of the magnetic field applying part and the electric field applying part can be reversed by 180°,
the magnetic field and the electric field to be applied are superimposed to form a superimposition region where both an electric field and a magnetic field are applied, and
the recording medium is arranged such that the first recording medium layer moves in the superimposition region.

18. The magnetic recording device according to claim 17, wherein
a width (Ws) in a track width direction of the superimposition region on the first recording medium layer is in a range of 1-200nm.

19. The magnetic recording device according to claim 17, wherein
one of the magnetic field applying part and the electric field applying part has a sharp tip end, and the tip end has a shape whose width (w, d) at a position (q) 1nm distant from the tip end is in a range of 0.4-80nm.

20. A magnetic data system formed with the magnetic recording device according to claim 17 and a magnetic data reading part, wherein
the magnetic data reading part has a configuration for reading magnetic data of the second recording medium layer of the recording medium.

* * * * *